US012597135B2

(12) United States Patent
Zhang et al.

(10) Patent No.: US 12,597,135 B2
(45) Date of Patent: Apr. 7, 2026

(54) SYSTEMS AND METHODS FOR UPDATING A GRAPHICAL USER INTERFACE BASED UPON INTRAOPERATIVE IMAGING

(71) Applicant: INTUITIVE SURGICAL OPERATIONS, INC., Sunnyvale, CA (US)

(72) Inventors: Hui Zhang, San Jose, CA (US); Cristian Bianchi, Capannori (IT); Troy K. Adebar, San Jose, CA (US); Carlo Camporesi, Alameda, CA (US); Sungwon Yoon, Palo Alto, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 21 days.

(21) Appl. No.: 18/344,789

(22) Filed: Jun. 29, 2023

(65) Prior Publication Data

US 2023/0360212 A1 Nov. 9, 2023

Related U.S. Application Data

(63) Continuation of application No. PCT/US2021/065327, filed on Dec. 28, 2021.

(Continued)

(51) Int. Cl.
*G06T 7/00* (2017.01)
*G06F 3/0485* (2022.01)
(Continued)

(52) U.S. Cl.
CPC .......... *G06T 7/0012* (2013.01); *G06F 3/0485* (2013.01); *G06T 7/12* (2017.01);
(Continued)

(58) Field of Classification Search
CPC . G06T 2207/20221; G06T 2207/30004; G06T 7/0014; A61B 34/20; A61B 90/37;
(Continued)

(56) References Cited

U.S. PATENT DOCUMENTS

| | | | |
|---|---|---|---|
| 6,633,657 B1 * | 10/2003 | Kump | ........................ G06T 5/92 |
| | | | 600/443 |
| 9,589,362 B2 * | 3/2017 | Sarkis | ................... G06T 1/0007 |

(Continued)

FOREIGN PATENT DOCUMENTS

| | | | | |
|---|---|---|---|---|
| CN | 111513660 A | * | 8/2020 | ......... A61B 1/00009 |
| CN | 113040873 A | * | 6/2021 | |

(Continued)

OTHER PUBLICATIONS

International Search Report and Written Opinion for Application No. PCT/US2021/065327. mailed Apr. 12, 2022, 16 pages.

(Continued)

*Primary Examiner* — Gandhi Thirugnanam
(74) *Attorney, Agent, or Firm* — Haynes & Boone, LLP.

(57) ABSTRACT

A system includes one or more processors, a user display, and memory having computer readable instructions stored thereon. The computer readable instructions, when executed by the one or more processors, cause the system to obtain pre-operative image data of anatomical passages of a patient, wherein the pre-operative image data includes a target, display the pre-operative image data including the target in a graphical user interface on the user display, receive intra-operative image data from an imaging system, identify a portion of the intra-operative image data corresponding to an instrument disposed in the anatomical passages of the patient, receive a user selection of a portion of the intra-operative image data corresponding to the target, and update the display of the pre-operative image data including the (Continued)

200

202 — RECEIVE PRE-OPERATIVE IMAGE DATA

204 — CONSTRUCT 3D MODEL OF PATIENT ANATOMY

206 — IDENTIFY TARGET IN 3D MODEL

208 — GENERATE ROUTE THROUGH PATIENT ANATOMY TO TARGET

210 — REGISTER IMAGE REFERENCE FRAME TO INSTRUMENT REFERENCE FRAME

212 — PROVIDE NAVIGATION GUIDANCE AS INSTRUMENT IS NAVIGATED TO DEPLOYMENT LOCATION NEAR TARGET

214 — RECEIVE INTRA-OPERATIVE IMAGE DATA

216 — RECEIVE SHAPE DATA FROM INSTRUMENT DURING INTRA-OPERATIVE IMAGING PROCEDURE

218 — SEGMENT INSTRUMENT FROM INTRA-OPERATIVE IMAGE DATA

220 — IDENTIFY TARGET IN INTRA-OPERATIVE IMAGE DATA

222 — REGISTER INTRA-OPERATIVE IMAGE REFERENCE FRAME TO INSTRUMENT REFERENCE FRAME

224 — MAP LOCATION OF TARGET FROM INTRA-OPERATIVE IMAGE DATA TO INSTRUMENT REFERENCE FRAME

226 — UPDATE TARGET LOCATION IN IMAGE REFERENCE FRAME target in the graphical user interface based on the intra-operative image data.

19 Claims, 17 Drawing Sheets

Related U.S. Application Data

(60) Provisional application No. 63/132,296, filed on Dec. 30, 2020.

(51) Int. Cl.
| | | |
|---|---|---|
| *G06T 7/12* | (2017.01) | |
| *G06T 7/30* | (2017.01) | |
| *G06T 19/20* | (2011.01) | |

(52) U.S. Cl.
CPC ............... *G06T 7/30* (2017.01); *G06T 19/20* (2013.01); *G06T 2207/10081* (2013.01); *G06T 2207/10121* (2013.01); *G06T 2207/20104* (2013.01); *G06T 2219/2004* (2013.01)

(58) Field of Classification Search
CPC ... A61B 6/5229; A61B 6/5235; A61B 6/5241; A61B 6/5247
See application file for complete search history.

(56) References Cited

U.S. PATENT DOCUMENTS

| | | | |
|---|---|---|---|
| 10,699,448 B2 | 6/2020 | Weingarten et al. | |
| 10,702,226 B2 | 7/2020 | Barak et al. | |
| 10,716,525 B2 | 7/2020 | Weingarten et al. | |
| 11,589,929 B2 | 2/2023 | Ekin | |
| 2009/0080742 A1* | 3/2009 | Moriya | G06T 7/33 |
| | | | 382/131 |
| 2014/0343416 A1* | 11/2014 | Panescu | A61N 5/1077 |
| | | | 600/431 |
| 2015/0073265 A1* | 3/2015 | Popovic | A61B 5/066 |
| | | | 600/424 |

| | | | |
|---|---|---|---|
| 2015/0221105 A1* | 8/2015 | Tripathi | A61B 5/0077 |
| | | | 382/131 |
| 2016/0005211 A1* | 1/2016 | Sarkis | G06T 1/0007 |
| | | | 345/419 |
| 2016/0058424 A1* | 3/2016 | Fialkov | A61B 8/4416 |
| | | | 600/411 |
| 2016/0217576 A1* | 7/2016 | Kabus | A61B 6/469 |
| 2017/0255891 A1* | 9/2017 | Morate | G06V 20/52 |
| 2018/0146911 A1* | 5/2018 | Teicher | A61B 5/6844 |
| 2019/0320878 A1* | 10/2019 | Duindam | G06T 7/11 |
| 2019/0343476 A1* | 11/2019 | Smith | G06T 7/0016 |
| 2020/0242767 A1* | 7/2020 | Zhao | A61B 34/37 |
| 2020/0245982 A1* | 8/2020 | Kopel | A61B 6/12 |
| 2020/0364878 A1* | 11/2020 | Bradski | G06N 3/084 |
| 2021/0386483 A1* | 12/2021 | Chiou | G06T 7/30 |
| 2022/0087750 A1* | 3/2022 | Kaeseberg | A61B 34/20 |
| 2023/0360212 A1* | 11/2023 | Zhang | G06F 3/0485 |

FOREIGN PATENT DOCUMENTS

| | | | | |
|---|---|---|---|---|
| EP | 2849670 B1 * | 3/2019 | | A61B 34/10 |
| EP | 3689244 A1 * | 8/2020 | | A61B 10/04 |
| JP | 2010508120 A * | 3/2010 | | |
| WO | WO-0224051 A2 | 3/2002 | | |
| WO | WO-2007033379 A2 * | 3/2007 | | A61B 1/00087 |
| WO | WO-2017139621 A1 * | 8/2017 | | A61B 34/10 |
| WO | WO-2018085287 A1 * | 5/2018 | | A61B 1/00009 |
| WO | WO-2018129532 A1 * | 7/2018 | | A61B 1/00009 |
| WO | WO-2018144698 A1 * | 8/2018 | | A61B 34/20 |
| WO | WO-2019217366 A1 * | 11/2019 | | G06T 7/33 |
| WO | WO-2021092116 A1 * | 5/2021 | | A61B 34/10 |
| WO | WO-2022134028 A1 * | 6/2022 | | |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
International Preliminary Report on Patentability for Application No. PCT/US2021/065327 mailed Jul. 13, 2023, 10 pages.

\* cited by examiner

400

402 — RECORD SHAPE DATA DURING AN IMAGE CAPTURE PERIOD

404 — RECEIVE IMAGING DATA CORRESPONDING TO THE IMAGE CAPTURE PERIOD

406 — IDENTIFY TARGET IN THE IMAGE DATA

408 — SEGMENT PORTION OF THE IMAGE DATA CORRESPONDING TO THE INSTRUMENT

410 — REGISTER IMAGE DATA TO THE SHAPE DATA

412 — UPDATE LOCATION OF THE TARGET FROM A PRE-OPERATIVE LOCATION TO AN INTRA-OPERATIVE LOCATION

500

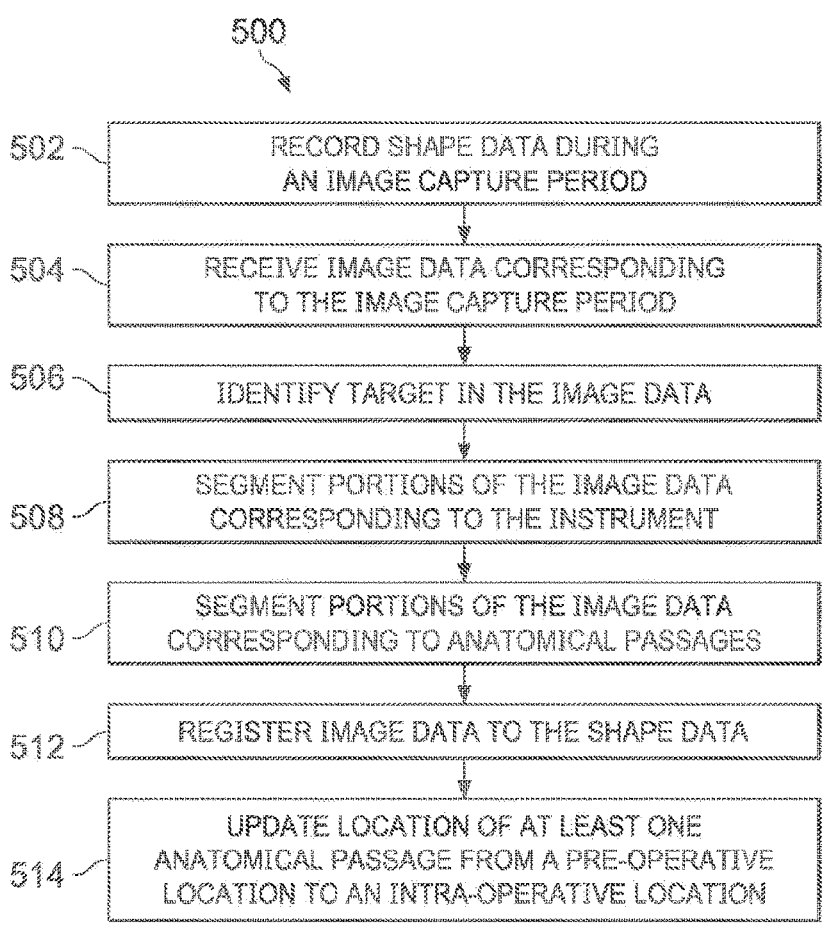

502 — RECORD SHAPE DATA DURING AN IMAGE CAPTURE PERIOD

504 — RECEIVE IMAGE DATA CORRESPONDING TO THE IMAGE CAPTURE PERIOD

506 — IDENTIFY TARGET IN THE IMAGE DATA

508 — SEGMENT PORTIONS OF THE IMAGE DATA CORRESPONDING TO THE INSTRUMENT

510 — SEGMENT PORTIONS OF THE IMAGE DATA CORRESPONDING TO ANATOMICAL PASSAGES

512 — REGISTER IMAGE DATA TO THE SHAPE DATA

514 — UPDATE LOCATION OF AT LEAST ONE ANATOMICAL PASSAGE FROM A PRE-OPERATIVE LOCATION TO AN INTRA-OPERATIVE LOCATION

FIG. 5

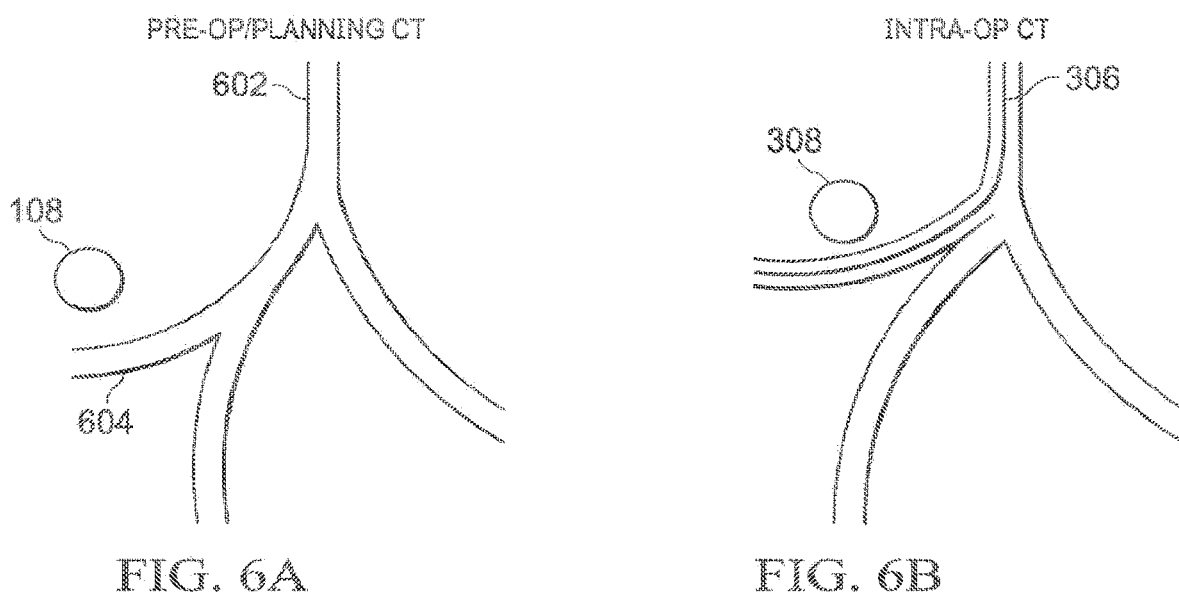

PRE-OP/PLANNING CT

602

108

604

INTRA-OP CT

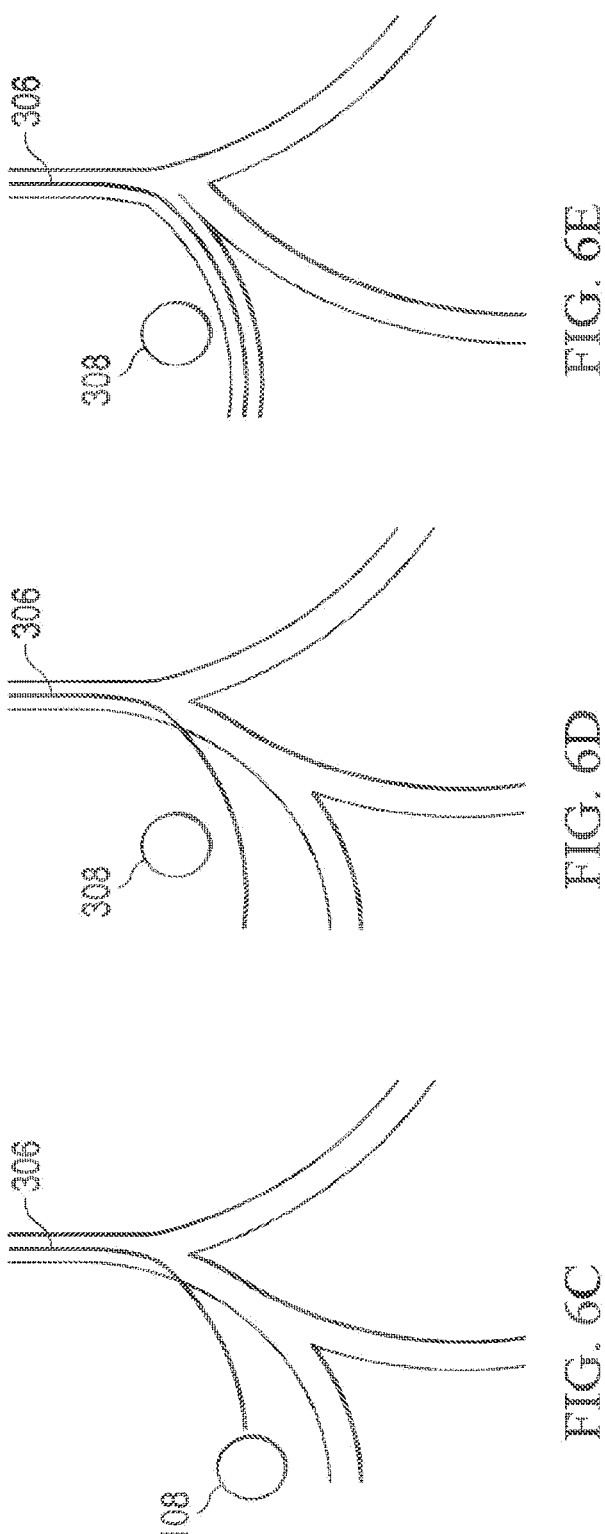

700

700

SYSTEMS AND METHODS FOR UPDATING A GRAPHICAL USER INTERFACE BASED UPON INTRAOPERATIVE IMAGING

CROSS-REFERENCE TO RELATED APPLICATIONS

This application is a continuation application filed under 35 U.S.C. § 111(a) claiming priority to co-pending international application PCT/US2021/065327 filed on Dec. 28, 2021 which claims the benefit of and priority to U.S. Provisional Application 63/132,296, filed Dec. 30, 2020, both of which are incorporated by reference herein in their entirety.

FIELD

The present disclosure is directed to systems and methods for planning and performing an image-guided procedure.

BACKGROUND

Minimally invasive medical techniques are intended to reduce the amount of tissue that is damaged during medical procedures, thereby reducing patient recovery time, discomfort, and harmful side effects. Such minimally invasive techniques may be performed through natural orifices in a patient anatomy or through one or more surgical incisions. Through these natural orifices or incisions, an operator may insert minimally invasive medical tools to reach a target tissue location. Minimally invasive medical tools include instruments such as therapeutic, diagnostic, biopsy, and surgical instruments. Medical tools may be inserted into anatomical passages and navigated toward a region of interest within a patient anatomy. Navigation may be assisted using images of the anatomical passages, obtained pre-operatively and/or intra-operatively. Improved systems and methods are needed to enhance information provided to a user via a graphical user interface based upon information received from intra-operative imaging.

SUMMARY

Consistent with some embodiments, a system may comprise a processor, a user display, and a memory having computer readable instructions stored thereon. The computer readable instructions, when executed by the processor, may cause the system to obtain pre-operative image data of anatomical passages of a patient, display the pre-operative image data in a graphical user interface on the user display, record shape data for an instrument disposed in the anatomical passages of the patient during an image capture period of an imaging system, and receive intra-operative image data from the imaging system corresponding to the image capture period. A portion of the intra-operative image data may correspond to the instrument. The computer readable instructions, when executed by the processor, may further cause the system to segment the portion of the intra-operative image data corresponding to the instrument, register the intra-operative image data to the shape data by comparing the shape data to the portion of the intra-operative image data corresponding to the instrument, and update the graphical user interface based upon the intra-operative image data.

Consistent with some embodiments, a method may comprise obtaining pre-operative image data of anatomical passages of a patient, displaying the image data in a graphical user interface on a user display, recording shape data for an instrument disposed in the anatomical passages of the patient during an image capture period of an imaging system, and receiving intra-operative image data from the imaging system corresponding to the image capture period. A portion of the intra-operative image data may correspond to the instrument. The method may further comprise segmenting the portion of the intra-operative image data corresponding to the instrument, registering the intra-operative image data to the shape data by comparing the shape data to the portion of the intra-operative image data corresponding to the instrument, and updating the graphical user interface based upon the intra-operative image data.

Consistent with some embodiments, a system may comprise a processor and a memory having computer readable instructions stored thereon. The computer readable instructions, when executed by the processor, may cause the system to obtain pre-operative image data of anatomical passages of a patient, display the image data in a graphical user interface on a user display, record shape data for an instrument disposed in the anatomical passages of the patient during an image capture period of an imaging system, and receive intra-operative image data from the imaging system corresponding to the image capture period. A portion of the intra-operative image data may correspond to the instrument. The computer readable instructions, when executed by the processor, may further cause the system to segment the portion of the intra-operative image data corresponding to the instrument, register the pre-operative image data to the intra-operative image data based at least in part upon comparing a portion of the intra-operative image data corresponding to an anatomical passage in which a distal portion of the instrument is disposed to a portion of the pre-operative image data corresponding to the anatomical passage in which the distal portion of the instrument is disposed, and update the graphical user interface based upon the intra-operative image data.

Other embodiments include corresponding computer systems, apparatus, and computer programs recorded on one or more computer storage devices, each configured to perform the actions of the methods.

It is to be understood that both the foregoing general description and the following detailed description are illustrative and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

FIG. 5 illustrates a method of registering image data to shape data from an instrument to update a location of an anatomic structure in a model.

FIGS. 6A-6E illustrate simplified diagrams of registering pre-operative image data and intra-operative image data to shape data from an instrument and updating a model displayed on a graphical user interface.

Figure 1:
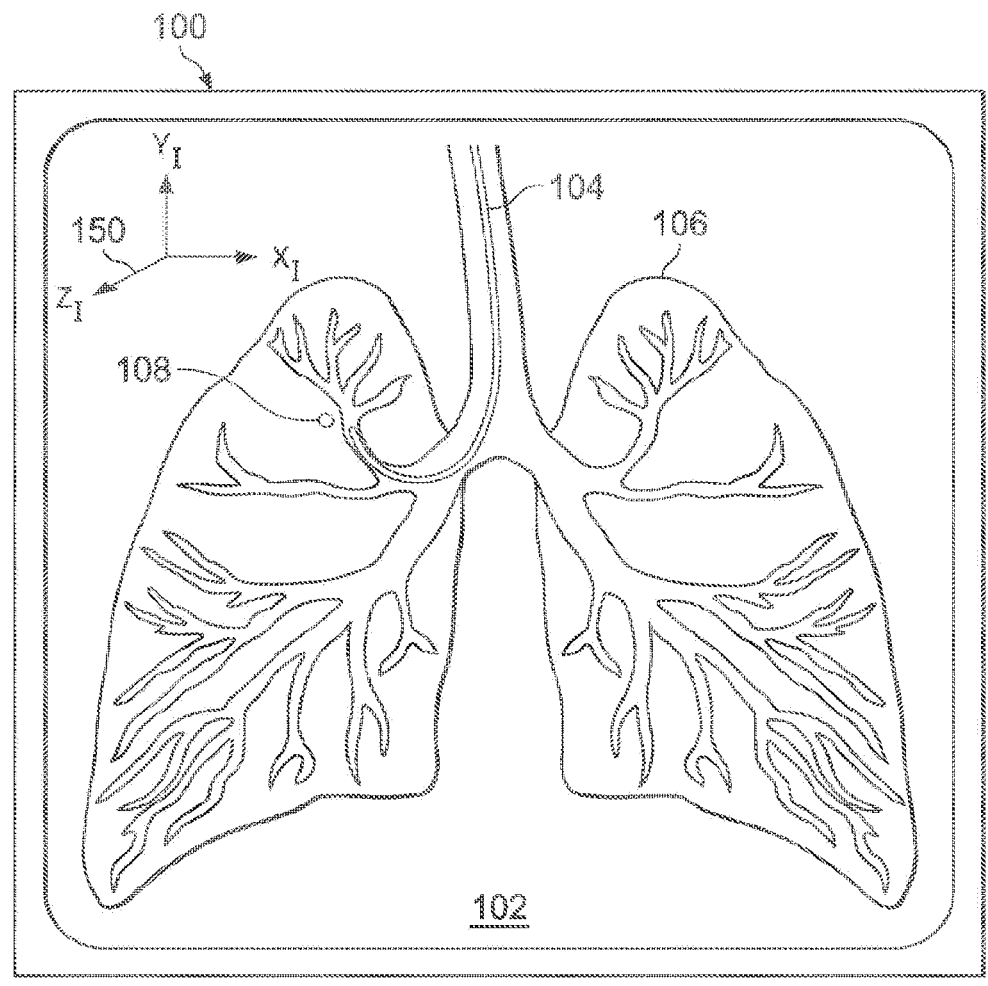
FIG. 1 illustrates a display system displaying an image of a medical instrument registered to an anatomic model.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The techniques disclosed in this document may be used to provide and update information provided to a user via a graphical user interface during minimally invasive procedures using intra-operative imaging, such as cone beam computerized tomography (CT) imaging. In some examples, a model of an anatomical structure may be constructed based upon a pre-operative imaging procedure and displayed on the graphical user interface. The model may be revised based upon an intra-operative imaging procedure performed during a minimally invasive procedure. In some examples, the image data produced by the intra-operative imaging may be utilized to revise a location of an instrument, an anatomic structure, or a target in the model constructed from a pre-operative imaging procedure.

With reference to FIG. 1, an image-guided surgical procedure may be robot-assisted or otherwise teleoperated. During the procedure, a display system 100 may display a virtual navigational image 102 having an image reference frame $(X_I, Y_I, Z_I)$ 150 in which a medical instrument 104 is registered (i.e., dynamically referenced) with an anatomic model 106 of a patient derived from pre-operative image data obtained, for example, from a CT scan. The anatomic model 106 may include a target 108, such as a lesion or nodule of interest, which the procedure is intended to address (e.g., biopsy, treat, view, etc.). In some embodiments, the virtual navigational image 102 may present a physician with a virtual image of a model of an anatomic structure (e.g., series of connected anatomical passages) from a perspective view or a plan view, as shown in FIG. 1. In some embodiments, the virtual navigational image 102 may present a physician with a virtual image of the internal surgical site from a viewpoint of medical instrument 104, for example, from a distal tip of medical instrument 104. In some embodiments, the display system 100 may present a real-time view from the distal tip of medical instrument 104, for example, when the medical instrument 104 comprises an endoscope. In some embodiments, the medical instrument 104 may be manipulated by a robot-assisted manipulator controlled by a control system, or processing system, which includes one or more processors. An example of a robot-assisted medical system will be described further at FIGS. 9 and 10.

Generating the virtual navigational image 102 involves the registration of the image reference frame $(X_I, Y_I, Z_I)$ 150 to a surgical reference frame $(X_S, Y_S, Z_S)$ of the anatomy and/or medical instrument reference frame $(X_M, Y_M, Z_M)$ of the medical instrument 104. This registration may rotate, translate, or otherwise manipulate by rigid or non-rigid transforms points associated with the segmented instrument shape from the image data and/or points associated with the shape data from a shape sensor disposed along a length of the medical instrument 104. This registration between the image and instrument reference frames may be achieved, for example, by using a point-based iterative closest point (ICP) technique as described in U.S. Pat. App. Pub. Nos. 2018/0240237 and 2018/0235709, incorporated herein by reference in their entireties, or another point cloud registration technique.

Figure 2:
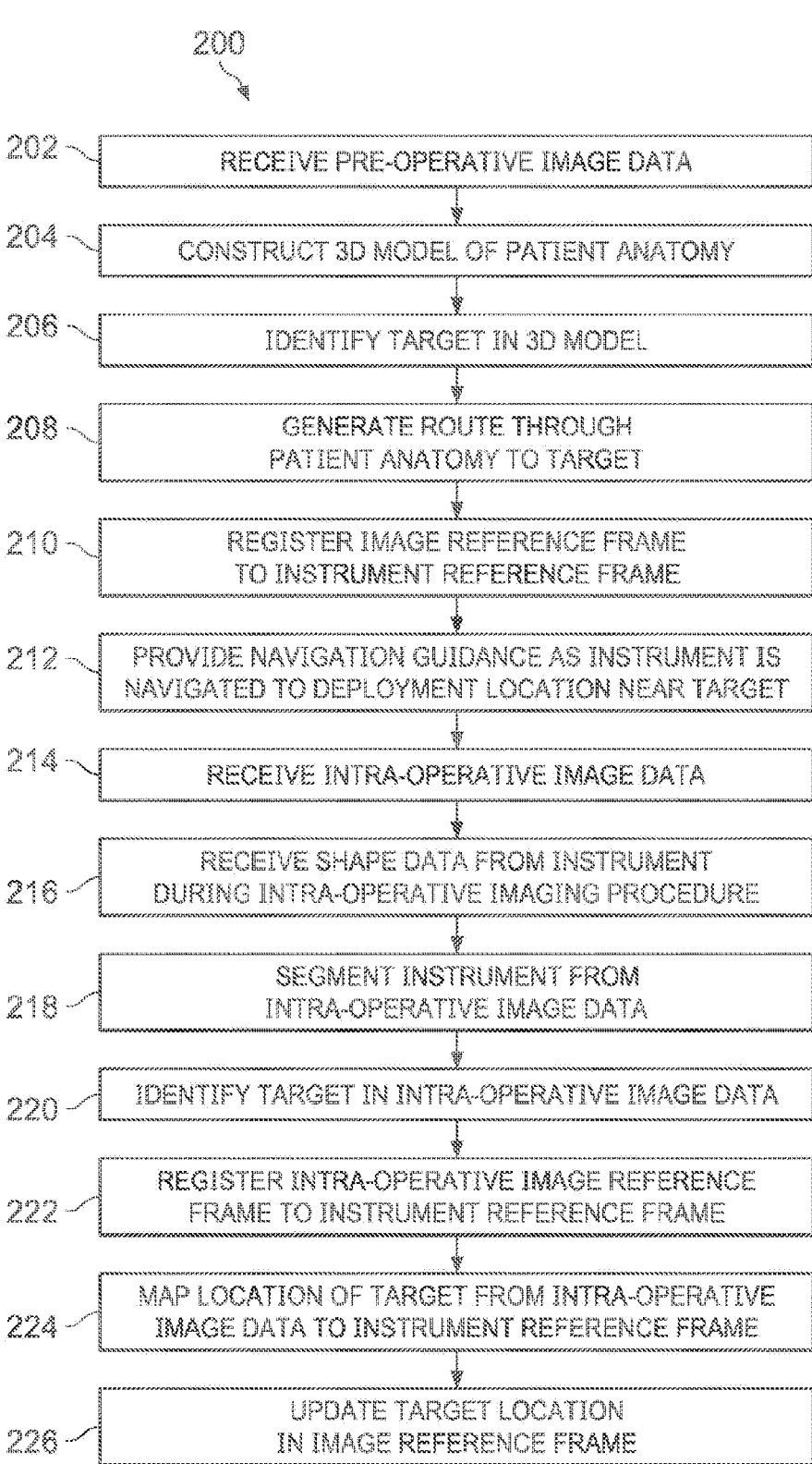
FIG. 2 illustrates a method for updating a graphical user interface based on intra-operative image data.

FIG. 2 illustrates an example of a method 200 for updating a graphical user interface for use while performing a minimally invasive procedure in accordance with some aspects of the present disclosure. At a process 202, pre-operative image data is received at a control system. For example, a CT scan of the patient's anatomy may be performed with a conventional fan beam CT scanner and the CT image data may be received by a control system of a robot-assisted medical system. Alternatively, pre-operative image data may be received from other types of imaging systems including magnetic resonance imaging systems, fluoroscopy systems, or any other suitable method for obtaining dimensions of anatomic structures. At process 204, a three-dimensional (3D) model of the anatomic structures (e.g., anatomic model 106 of FIG. 1) may be constructed from the pre-operative image data by the control system. At process 206, a target may be identified in the 3D model (e.g., three-dimensional rendering) or the pre-operative image data from which it was constructed. For example, the target 108 of FIG. 1 may be identified in the anatomic model 106 as a region of interest for investigation or treatment. The target may be automatically identified by a control system and confirmed by a user or may be visually identified by the user and manually selected or indicated in the 3D model, for example, through the display system 100. At process 208, a route through anatomical passages formed in the anatomic structures is generated. The route may be generated automatically by the control system, or the control system may generate the route based on user inputs. The route may indicate a path along which a medical instrument (e.g., medical instrument 104 of FIG. 1) may be navigated into close proximity with the target. In some embodiments, the route may be stored in a control system and incorporated into the images displayed on display system 100.

To provide accurate navigation through the anatomical passages, a reference frame 150 of the pre-operative image data (and subsequently constructed 3D model) may be registered to a reference frame of the medical instrument at process 210. For example, a shape sensor (e.g., a fiber optic shape sensor or one or more position sensors) disposed along a length of the medical instrument may be used to provide real-time shape data (e.g., information regarding a shape of the instrument and/or a position of one or more points along the length of the instrument). This shape data may be utilized to register the instrument to the 3D model constructed from the pre-operative image data and to track a location of the instrument during use. Upon successful registration, a process 212 may include providing navigation guidance as the instrument is navigated through the anatomical passages to a deployment location in proximity to the target. Navigation may be performed manually by a user with provided navigation guidance, automatically by a control system, or via a combination of both.

With the instrument positioned at or near the deployment location within the anatomy of the patient (e.g., in close proximity to the target), an intra-operative imaging scan may be performed. At a process 214, intra-operative image data may be received at a control system from an intra-operative imaging system. In some examples, the intra-operative imaging system may be a cone beam CT ("CBCT") scanner than generates intra-operative CT scan image data, although any suitable imaging technique may be used without departing from the embodiments of the present disclosure. As compared to other imaging techniques such as conventional CT or fluoroscopy, CBCT imaging may provide a more rapid scan of a region of the patient's anatomy to reduce delay of the procedure and may also have more portable and compact hardware.

As mentioned above, the intra-operative image data may be received at a control system or other processing platform associated with the instrument. Communication of the image data may originate from an application programming interface of the intra-operative imaging system. As an example, the Cios Spin® imaging system marketed by Siemens® Medical Solutions USA, Inc. utilizes a protocol called NaviLink 3D™ which provides a digital interface to connect the imaging system with navigation systems and transfer datasets thereto. It is also contemplated that in some examples the shape data associated with the instrument may be transferred to the imaging system, or both the shape data and the image data may be transferred to a common platform for processing. In this regard, registration of the shape data of the instrument to the intra-operative image data may be performed by the control system, by the imaging system, or by another platform in operable communication with the intra-operative imaging system and the control system. Typically, the communication of the image data to or from the control system will use a Digital Imaging and Communications in Medicine ("DICOM") standard. The image data may also be received in a maximum intensity projection ("MIP") or pseudo-CT streaming format. In some embodiments, receiving the image data may include receiving one or more timestamps associated with the image data. A first timestamp may indicate the start time of the scan and a second timestamp may additionally indicate a stop time of the scan. Alternatively, a timestamp may be associated with each instance of image data. In order to ensure accurate correlation, a clock of the control system of the instrument may be synchronized with a clock of the imaging system and each instance of shape data may also be associated with a timestamp. In this regard, each timestamped instance of image data may be paired with a correspondingly timestamped instance of shape data.

In order to register the intra-operative imaging scan to the instrument, while the intra-operative imaging scan is performed, at a process 216, shape data from the instrument captured during the intra-operative imaging process 214 may be received. The shape data may be captured for only a brief period of time or may be captured during the whole image capture period of the intra-operative imaging scan. A variety of synchronizing techniques may be used to ensure that only shape data corresponding to the image capture period is used for registration, even though shape data outside the image capture period may also be recorded.

At process 218, the image data from the intra-operative scan, or a portion thereof, may be segmented. In this regard, discrete units of the image data (e.g., pixels or voxels) may be analyzed to assign an intensity value to each unit. Discrete units having the same or similar intensity values may be aggregated to form components. Morphological operations may be utilized to interconnect non-contiguous components having similar intensity values. In some embodiments, computer software, alone or in combination with manual input, is used to convert the image data into a segmented two-dimensional or three-dimensional composite representation or model of a partial or an entire anatomic organ or anatomic region. The model may describe the various locations and shapes of the anatomical passages and their connectivity. More specifically, during the segmentation process the pixels or voxels may be partitioned into segments or elements or be tagged to indicate that they share certain characteristics or computed properties such as color, density, intensity, and texture. In some embodiments, segmenting the image data may comprise selecting components to associate with certain objects. For example, segmenting the image data associated with the instrument may include selecting imaging units or components based upon one or more factors including proximity to the target, the shape data, an approximate registration of the instrument to the patient, and an expected instrument intensity value. An expected instrument intensity value may include a range of values associated with materials from which the instrument is composed. In some embodiments, an algorithm (e.g., Gaussian Mixture Model) may be used to establish the expected instrument intensity. In some embodiments, segmenting the image data may further comprise utilizing processes established by the control system using deep learning techniques. The image data corresponding to the medical instrument may be segmented or filtered out of the image data, and a model of the instrument shape may be generated. For example, the medical instrument may be identified as a medical instrument in the image data by the segmentation or filtering by CT number or Hounsfield value associated with the medical instrument. This data associated with the medical instrument may be isolated from other portions of the image data that are associated with the patient or with specific tissue types. A three-dimensional mesh model may be formed around the isolated data and/or a centerline may be determined that represents a centerline of the medical instrument. The segmented image data for the instrument may be expressed in the image reference frame.

Information about the instrument may be used to seed the segmentation process. For example, an instrument (e.g., a steerable catheter) may include a metal spine embedded in a non-metal sheath. In this regard, high contrast in the intra-operative image data associated with the spine may be identified first, and a region around the spine may be searched for the non-metal sheath in pixels or voxels having less contrast. In a similar regard, a high-contrast fiducial marker may be inserted through a working channel of an instrument during intra-operative imaging to improve segmentation of the instrument.

In some instances, segmenting of the instrument may be determined to have produced unsatisfactory results. For example, the segmentation may have resulted in a plurality of non-contiguous components with gaps in between. Alternatively, the segmentation may have resulted in an instrument dimension that is known to be inaccurate. For example, the segmented instrument in the intra-operative image data may appear to have a diameter of 1 mm or 10 mm when it is known that the instrument has a diameter of 5 mm. As another example, it may be determined that one or more relevant portions of the instrument are outside the volume of the intra-operative image data.

As a result of determining the segmentation to be unsatisfactory, the control system may implement a low accuracy mode in which registration of the intra-operative image data to the instrument may proceed with translation movements only (e.g., movement only along the X-, Y-, and/or Z-axes) while preventing rotations. Alternatively, unsatisfactory results of segmentation may result in an instruction or prompt being generated to direct a user to identify the instrument in the image data, for example, by using an input device and the display system to select components associated with the instrument per process 212 above.

At a process 220, the target may be identified in the intra-operative image data. In some embodiments, when the instrument has already been segmented or identified, identifying the target may comprise establishing a region of interest in the image data within a predetermined range of the instrument. The region of interest may then be analyzed to segment the target from the region of interest. In this regard, the search field in which to locate the target may be reduced based upon an assumption that the instrument was previously navigated into close proximity with the target. In some embodiments, identifying the target may include receiving an indication or selection from a user at a user interface. For example, a user may manually select portions of the image data associated with one or more components on the display system to associate with the target. Manual identification of the target may be necessary when automatic identification of the target has produced unsatisfactory results and a user is instructed to manually identify the target in the image data. In some instances, identifying the target in the intra-operative image data may result in registering the pre-operative image data (or 3D model) to the intra-operative image data based upon a pre-operative location of the target and an intra-operative location of the target.

At a process 222, the intra-operative image data may be registered to the shape data by comparing the shape data to the portion of the image data corresponding to the instrument. The shape data from the medical instrument may be expressed in the medical instrument reference frame and/or the surgical reference frame. This registration may rotate, translate, or otherwise manipulate by rigid or non-rigid transforms points associated with the segmented shape and points associated with the shape data. In some embodiments, this registration may be performed using an iterative closest point algorithm or another point cloud registration technique. Optionally, data points may be weighted based upon segmentation confidence or quality to assign more influence to data points which are determined to be more likely to be accurate. Alternatively, registering the intra-operative image data to the shape data may be performed using coherent point drift or an uncertainty metric (e.g., RMS error). In some embodiments, the segmented shape of the medical instrument is registered to the shape data and the associated transform (a vector applied to each of the points in the segmented shape to align with the shape data in the shape sensor reference frame) may then be applied to the entire three-dimensional image and/or to subsequently obtained three-dimensional images during the medical procedure. The transform may be a six degrees-of-freedom (6DOF) transform, such that the shape data may be translated or rotated in any or all of X, Y, and Z and pitch, roll, and yaw. Discussion of processes for registering an instrument to image data may be found, for example, in Intl. Pat. Pub. No. WO2021/092116 (filed Nov. 5, 2020) (disclosing "Systems and Methods for Registering an Instrument to an Image Using Change in Instrument Position Data") and Intl. Pat. Pub. No. WO2021/092124 (filed Nov. 5, 2020) (disclosing Systems and Methods for Registering an Instrument to an Image Using Point Cloud Data), both of which are incorporated by reference herein in their entireties.

With the image reference frame registered to the medical instrument reference frame, the images displayed to the operator on the display system may allow the operator to more accurately steer the medical instrument, visualize a target lesion relative to the medical instrument, observe a view from the perspective of a distal end of the medical instrument, and/or improve efficiency and efficacy of targeted medical procedures.

In some embodiments, the intra-operative image data may be registered with pre-operative image data obtained by the same or a different imaging system. Thus, by registering the shape data to the intra-operative image data, the registration of the shape data to the pre-operative image data may also be determined. In some embodiments, an anatomic image generated from the intra-operative image data and/or the pre-operative image data may be displayed with the image of the instrument derived from the instrument shape sensor data. For example, a model of the instrument generated from the instrument shape data may be superimposed on the image of the patient anatomy generated from the pre-operative or intra-operative image data.

At a process 224, the intra-operative location of the target may be mapped to the instrument reference frame based upon the registration performed in process 222. The method 200 of FIG. 2 may include segmenting portions of the image data corresponding to the target. The intra-operative location of the target may be compared to the pre-operative location of the target. Similarly, the pre-operative geometry (e.g., surface boundaries) of the target may be compared to the intra-operative geometry of the target. If there is a discrepancy, the target location or geometry may be updated within the model to the intra-operative location and/or geometry at a process 226. The updated location of the target may be shown with respect to the 3D model and/or the instrument on the graphical user interface via a display system to facilitate the minimally-invasive procedure.

The method 200 of FIG. 2 may additionally or alternatively include processes for segmenting portions of the image data corresponding to one or more anatomical passages using similar segmentation techniques as those discussed above. The segmentation of the anatomical passages may result in revised surface boundaries, diameters, locations, etc. of one or more anatomical passages. After registering the intra-operative image data to the shape data, the revised geometry and/or location of at least one of the anatomical passages may be updated in the 3D model displayed on the graphical user interface from a pre-operative configuration to an intra-operative configuration based upon the intra-operative image data. The updated configuration of one or more anatomical passages may result in an updated navigation path of the instrument. For example, intra-operative imaging may indicate that an anatomical passage previously believed to be too narrow for safe navigation of the instrument may, in fact, be larger in diameter than was indicated by the pre-operative imaging. By updating the diameter in the model, the control system may determine that the revised anatomical passage provides a more direct route to the target. These processes of updating anatomical structures in not limited to anatomical passages (e.g., airways). For example, intra-operative image data may be utilized to revise anatomy borders of tissue and organs in the model (e.g., pleura, lung fissures, vasculature, etc.).

Segmentation and updating of the target, anatomical passages, and/or other anatomical structures may be performed automatically by the control system independent of user input. Alternatively, these processes may be initiated by user input to identify one or more locations in the intra-operative image data corresponding to the respective feature.

Figure 3A:
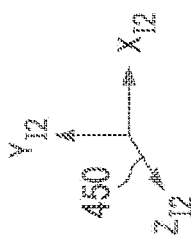
FIG. 3A illustrates a simplified diagram of a user interface displaying image data from an intra-operative imaging procedure.
Figure 3D:
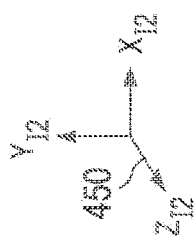
FIG. 3B illustrates a simplified diagram of a user interface displaying image data from an intra-operative imaging procedure in which an instrument and a target are identified.

In some embodiments, the intra-operative image data received at process 214 of FIG. 2 may be displayed on a user interface 300 of a display system as shown in FIG. 3A. A viewing mode 302 may provide a 3D rendering 301 of the intra-operative image data in an intra-operative image reference frame ($X_{I2}$, $Y_{I2}$, $Z_{I2}$) 450. Pixels or voxels may be displayed with assigned intensity values which provide an initial visual demarcation between distinct structures.

Following the segmentation process 218 of FIG. 2 the segmented instrument may be displayed in conjunction with the intra-operative image data on the display system. Similarly, following the identification of the target at process 220 of FIG. 2, the segmented target may be displayed in conjunction with the intra-operative image data on the display system. FIG. 3B illustrates a viewing mode 304 providing a two-dimensional and/or three-dimensional view of the intra-operative image data in which the instrument 306 and intra-operative target 308 (which may be the same as the pre-operative target 108 in a different location) have been segmented. The viewing mode 304 may display the segmented instrument centerline and/or boundary registered to the 3D model. When segmentation is unsuccessful, the user interface 300 may allow a user to manually identify the catheter and/or the target. Following segmentation or identification, the instrument 306 and target 308 may be displayed in a different color or otherwise visually distinguished from surrounding anatomical structures.

Upon segmentation or identification of the instrument 306 in the intra-operative image data, the intra-operative image reference frame 450 may be registered to the medical instrument reference frame, as discussed above in relation to process 222 of FIG. 2.

Figure 4:
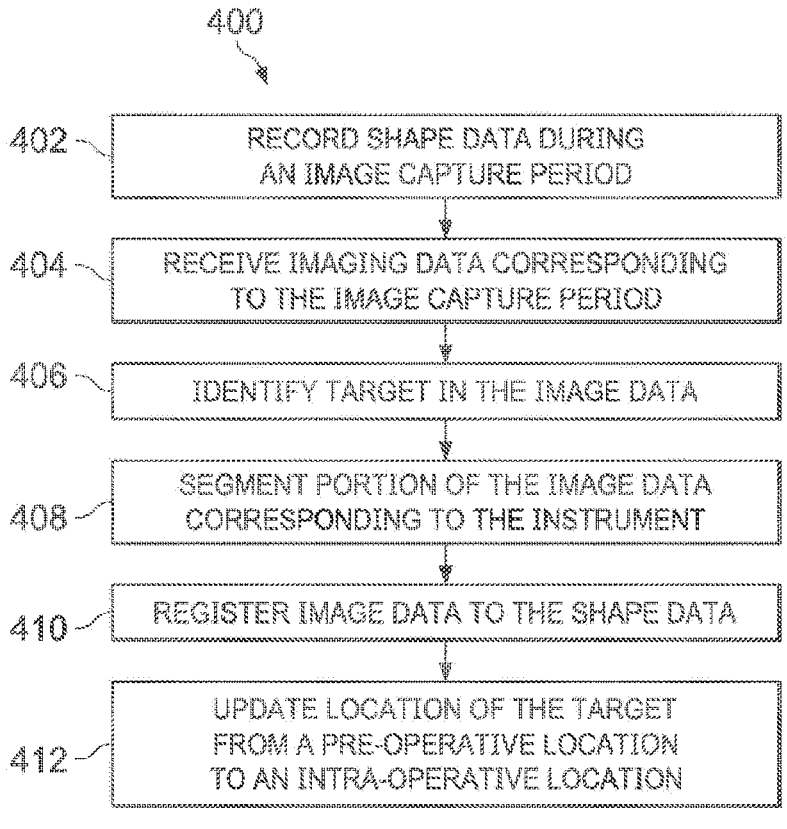
FIG. 4 illustrates a method of registering image data to shape data from an instrument to update a location of a target in a model.

As discussed above with reference to process 226 in FIG. 2, a target location may be updated from a location based on pre-operative image data to a location based on intra-operative image data. FIG. 4 illustrates a method 400 of registering intra-operative image data to shape data from an instrument to update a location of a target in a model. At a process 402, instrument shape data may be recorded during an image capture period of an imaging system. The imaging system may be cone beam CT system or any other imaging system configured for capturing intra-operative images of an instrument and patient anatomy. At a process 404, image data corresponding to the image capture period may be received, the image data including the patient's anatomy, the target of the procedure, and the instrument. At a process 406, the target is identified in the image data. For example, the target may be segmented by the control system or other processing platform or may be manually identified by a user. At a process 408, a portion of the image data corresponding to the instrument may be segmented. Using the segmented image data and the shape data recorded in process 402, the image data may be registered to the shape data based upon the shape of the instrument during the image capture period at a process 410. At a process 412, using the registered image data, the location of the target may be updated from a pre-operative location based upon pre-operative imaging to an intra-operative location based upon the intra-operative imaging, as discussed below with reference to FIGS. 6A-6E. The updated target location may improve navigation of the instrument to the target.

Similar to the process 226 for updating a location of a target in the image reference frame, an additional or alternative process may be used to update a location of an anatomical passage in the image reference frame. FIG. 5 illustrates a method 500 of registering intra-operative image data to shape data from an instrument to update a location of an anatomic structure in a model. At a process 502, instrument shape data may be recorded during an image capture period of an imaging system. The imaging system may be cone beam CT system or any other imaging system configured for capturing intra-operative images of an instrument and patient anatomy. At a process 504, image data corresponding to the image capture period may be received, the image data including the patient's anatomy, the target of the procedure, and the instrument. At a process 506, the target is identified in the image data. For example, the target may be segmented by the control system or other processing platform or may be manually identified by a user. At a process 508, a portion of the image data corresponding to the instrument may be segmented and, at a process 510, portions of the image data corresponding to anatomical passages may be segmented. Using the segmented image data and the shape data recorded in process 502, the image data may be registered to the shape data based upon the shape of the instrument during the image capture period at a process 512. At a process 514, using the registered image data, the location of one or more anatomical passages may be updated from a pre-operative location based upon pre-operative imaging to an intra-operative location based upon the intra-operative imaging, as discussed below with reference to FIGS. 6A-6E. Updating of the one or more passages may provide a more accurate path from a current location of the instrument to the target. It should be appreciated that method 400 and method 500 are both optional and may be performed simultaneously or consecutively.

As discussed above in relation to process 210 in FIG. 2, an image reference frame of pre-operative image data may be registered to an instrument reference frame. Similarly, an intra-operative image reference frame may be registered to the instrument reference frame as discussed above in relation to process 222. The common registration between these reference frames allows for updating of a location of a target and/or a location of one or more anatomical passages in the 3D model generated from pre-operative imaging data. FIGS. 6A-6E provide simplified diagrams to illustrate updating of a location of a target and/or an anatomical passage in a model, which may be performed after registering pre-operative image data in an image reference frame 150 and intra-operative image data in an intra-operative image reference frame 450 to shape data from an instrument in a medical instrument reference frame (e.g., medical instrument reference frame 350 of FIG. 10) which may also be registered to a surgical reference frame (e.g., surgical reference frame 250 of FIG. 10) in which a patient is positioned. Initially, a 3D model 602 may be constructed from pre-operative image data as shown in FIG. 6A. The model may include anatomical passage 604 and a pre-operative location of target 108 disposed relative to anatomical passage 604. During a medical procedure, an instrument 306 including a shape sensor may be inserted into anatomical passage 604. The image reference frame 150 may be registered to the medical instrument reference frame 350, for example, based upon the shape of anatomical passage 604 in the pre-operative image data and shape data from the shape sensor. Additionally, while the instrument 306 is disposed within anatomical passage 604, intra-operative imaging may be obtained, for example, using cone beam CT. As shown in FIG. 6B, the intra-operative image data may indicate a different location of target 308 and a different location and shape of anatomical passage 604 relative to adjacent anatomical structures.

Using the shape of the instrument 306 in the intra-operative image data and shape data from a shape sensor associated with the instrument, the intra-operative image reference frame 450 may be registered to the medical instrument reference frame 350. Accordingly, the image reference frame 150 and the intra-operative image reference frame 450 may also be registered. This registration arrangement allows for the pre-operative location of the target 108 to be updated to the intra-operative location of the target 308 as described above with reference to FIG. 4, and anatomical passages in a model to be updated as described above with reference to FIG. 5.

During the time that elapses between a pre-operative imaging procedure and an intra-operative imaging procedure, a location of a target and/or a location of an anatomical passage may change with respect to other anatomical structures of a patient. For example, insertion of the instrument 306 may cause an anatomical passage (e.g., anatomical passage 604) to move relative to other anatomical passages and structures (e.g., other organs). During a minimally invasive procedure, the location of the anatomical passage 604 may be outdated in the model constructed from pre-operative image data due to movement of the anatomical passage 604 subsequent to the pre-operative imaging procedure. The outdated location or shape of anatomical passage 604 in the model may cause the graphical user interface to display shape data that makes it appear that the instrument 306 is disposed external to the anatomical passage 604, despite actually being disposed within the anatomical passage 604, as shown in FIG. 6C. Similarly, an outdated location of the target 108 may cause the graphical user interface to display a configuration in which the location of the target 108 is not accurately depicted in relation to the instrument 306. For example, as shown in FIG. 6C, the information displayed on the graphical user interface may make it appear that the target 108 is directly in front of the instrument 306 when, in fact, the target 108 is offset to a side of the instrument 306. Because a user may rely on the model and instrument shape data displayed in the graphical user interface during navigation of the instrument, the outdated locations of the target and/or anatomical structures may hinder navigation, perhaps even preventing a user from navigating the instrument to the target.

Accordingly, intra-operative image data may be used to update the model to more accurately depict a location of the target and/or a location of an anatomical passage. For example, FIG. 6D illustrates an example in which the model of the anatomical passages displayed on the graphical user interface remains based on pre-operative image data, but the location of the target has been updated to a location based on the intra-operative image data, which may provide a more accurate spatial relationship between the target 308 and the instrument 306 on the graphical user interface. Thus, the displayed spatial relationship between the instrument 306 and the target 308 in FIG. 6D may be accurate while the displayed spatial relationships between the instrument 306 and the anatomical passage 604 and between the target 308 and the anatomical passage 604 may be outdated. FIG. 6E illustrates an example in which the model of the anatomical passages displayed on the graphical user interface has been updated to reflect an intra-operative location and shape of anatomical passage 604. The location of the target 308 is also updated in the example shown in FIG. 6E. In this regard, the graphical user interface in the example of FIG. 6E depicts the anatomical passage 604, the target 308, and the instrument 306 in a configuration based on the intra-operative image data.

An example of a graphical user interface for performing various processes discussed in above in relation to FIG. 2 is illustrated in FIGS. 7A-7H. A graphical user interface 700 may include a plurality of view windows for displaying visual information to a user. For example, the illustrated embodiment of FIG. 7A includes view windows 702, 704, and 706 illustrating cross sections of the intra-operative image data taken along coronal, transverse, and sagittal planes, respectively. Although three view windows are illustrated, more or less view windows may be displayed at any given time.

Figure 7A:
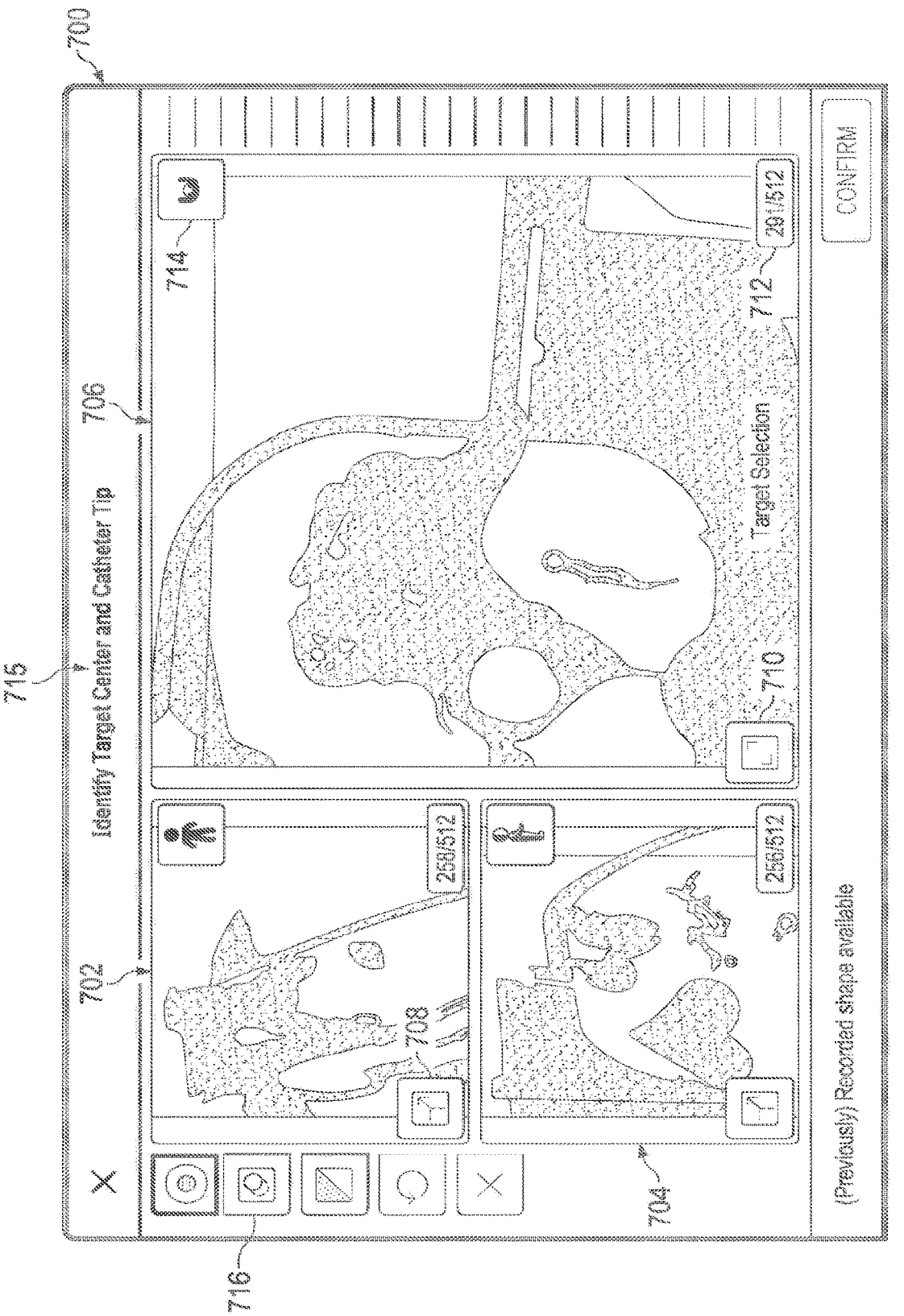
FIGS. 7A-7G illustrate information displayed on a graphical user interface during various processes of FIG. 2.

In the illustrated embodiment of FIG. 7A, a primary view window 706 is larger than two secondary view windows 702 and 704. A user may select the visual information to be displayed in the primary view window 706 by selecting a maximize button 708 on the secondary view window displaying the visual information desired to be viewed in the primary view window 706. Similarly, a user may enlarge the information shown in the primary view window 706 to a full-screen view by selecting the full-screen button 710. A view indicator 714 may be overlaid on each view window 702, 704, 706 to indicate to a user the plane or orientation to which the currently displayed images correspond.

Each view window may allow a user to scroll through a series of consecutive intra-operative images taken along parallel planes, for example, by hovering a cursor over a given view window and rotating a scroll wheel or other input device. An image indicator 712 may indicate the current image being displayed and the total number of images available for each view. A toolbar 716 may be displayed in the graphical user interface to allow a user to adjust various properties of the displayed visual information such as zoom, contrast, etc.

Figure 7B:
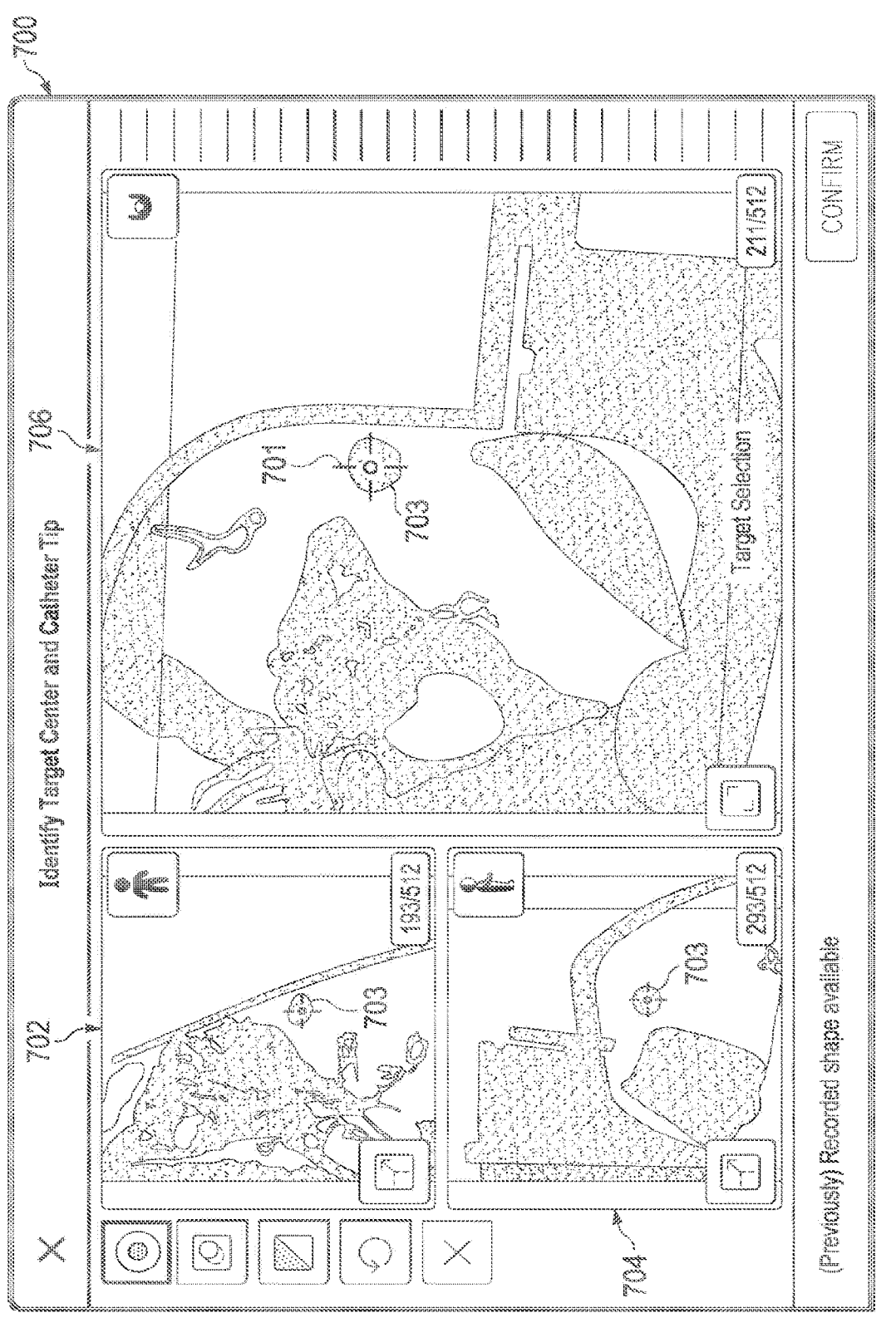

FIG. 7A illustrates a prompt 715 provided to a user stating "Identify Target Center and Catheter Tip." As shown in FIG. 7B, and with regard to process 220 of FIG. 2, a user may select the target (e.g., by clicking a mouse or tapping a touchscreen). The user may scroll through each series of images until the target is visible prior to making the selection. To illustrate, in FIG. 7A, the target does not appear to be visible but the target 703 is visible in FIG. 7B. By comparing the image indicators 712 of each view window between FIGS. 7A and 7B, it can be seen that the user has scrolled through each series of images until the target is visible. A target icon 701 may be generated at the selected location in each of the view windows. This process may be repeated for each of the view windows 702, 704, 706. Alternatively, in some embodiments, a user may select the target 703 in only one view window and the control system may automatically identify the target in the other view windows. As another example, the control system may identify the target independent of any user input based on known or anticipated properties of the target (e.g., expected pixel or voxel intensity value).

Figure 7C:
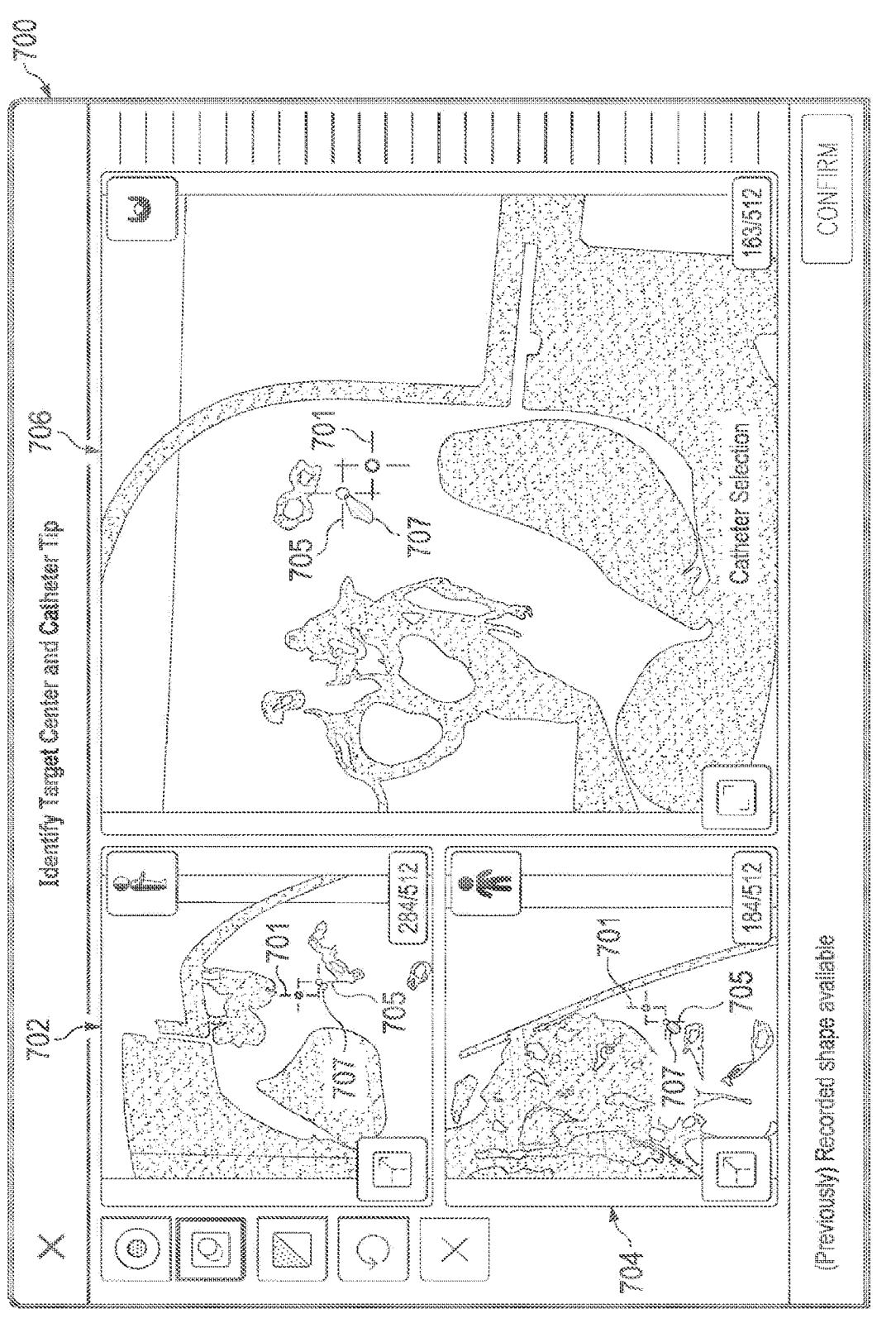

Similarly, with reference to FIG. 7C, a user may also select a location associated with the instrument 707 in one or more of the view windows. As with the target, the user may scroll through the respective images of each view window until the instrument 707, or a portion thereof, is visible in the view window. In the illustrated example, the user has selected the distal tip of the instrument 707 in each view window and an instrument icon 705 has been generated at each selected location. The selected location of the distal tip of the instrument 707 may be used to seed the segmentation process (e.g., process 220 of FIG. 2). For example, during segmentation, the control system may seek voxels having intensity values similar to the intensity value of the voxel identified by the user as corresponding to the distal tip of the instrument 707. Alternatively, the instrument 707 may be identified and segmented from the intra-operative image data automatically. In such an embodiment, the control system may populate the view windows of the graphical user interface with the respective instrument icons 705 and the user may be asked only to confirm that the identified location of the distal tip of the instrument 707 is accurate.

Figure 7D:
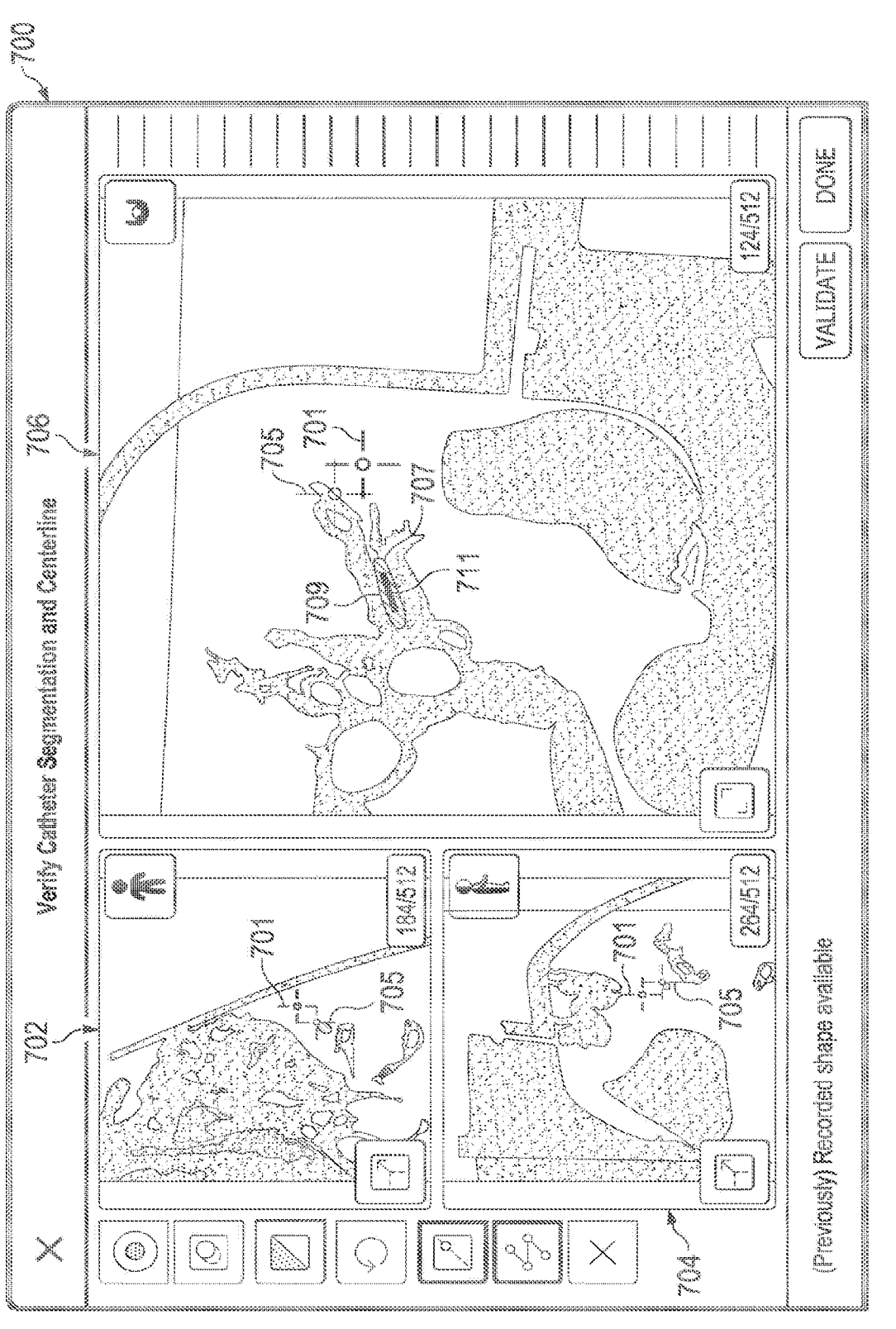
Figure 7E:
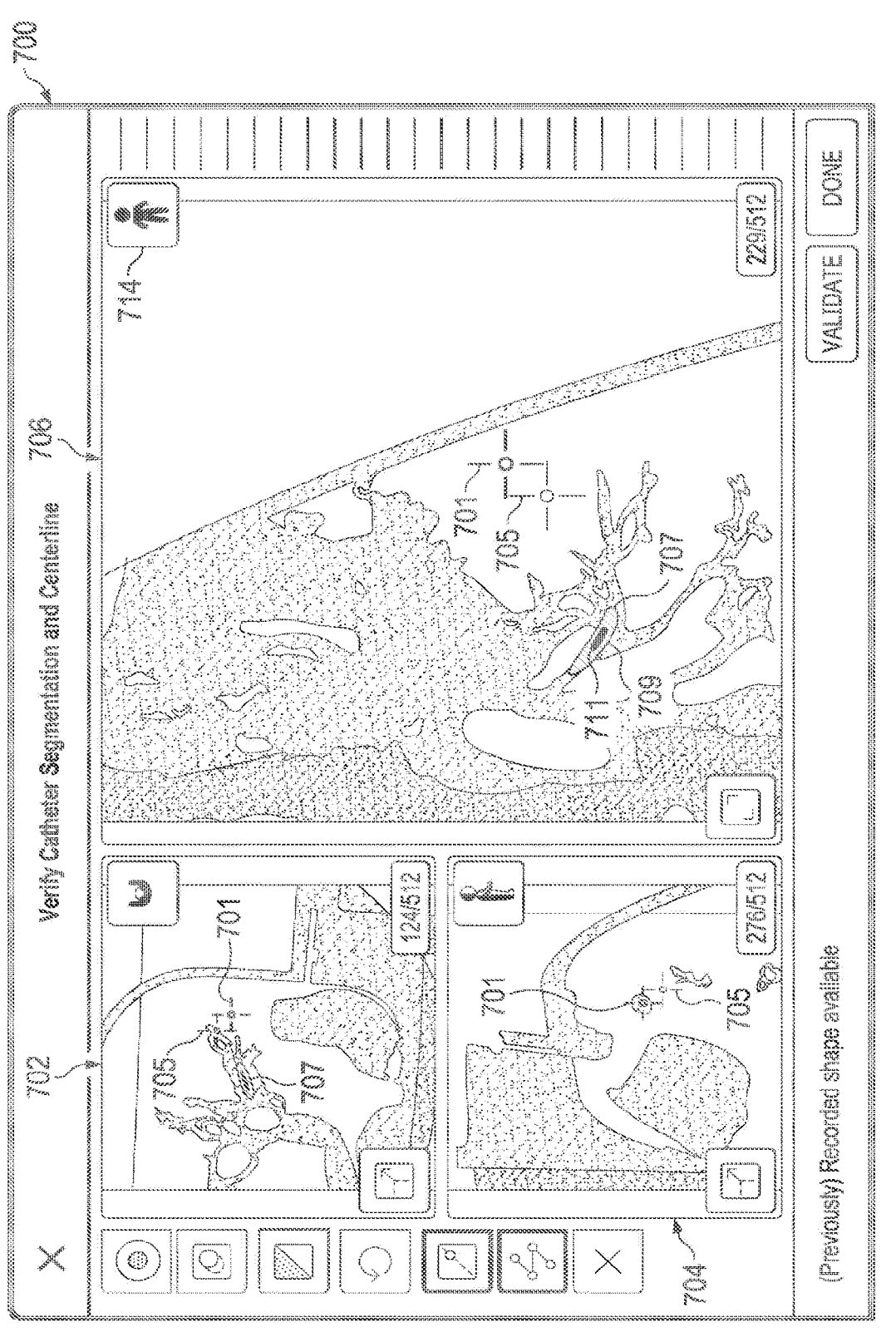

Following segmentation, the graphical user interface 700 may display the segmented instrument 707 overlaid on the intra-operative image data as shown in FIG. 7D. Each view window 702, 704, 706 may display an instrument boundary 709 and/or an instrument centerline 711. The user may scroll through the series of images and verify that the segmentation process appears to have rendered satisfactory results. For example, FIG. 7E illustrates a different set of images in each view window as compared to FIG. 7D, each illustrating the segmented instrument 707, target icons 701, and instrument icons 705.

Figure 7F:
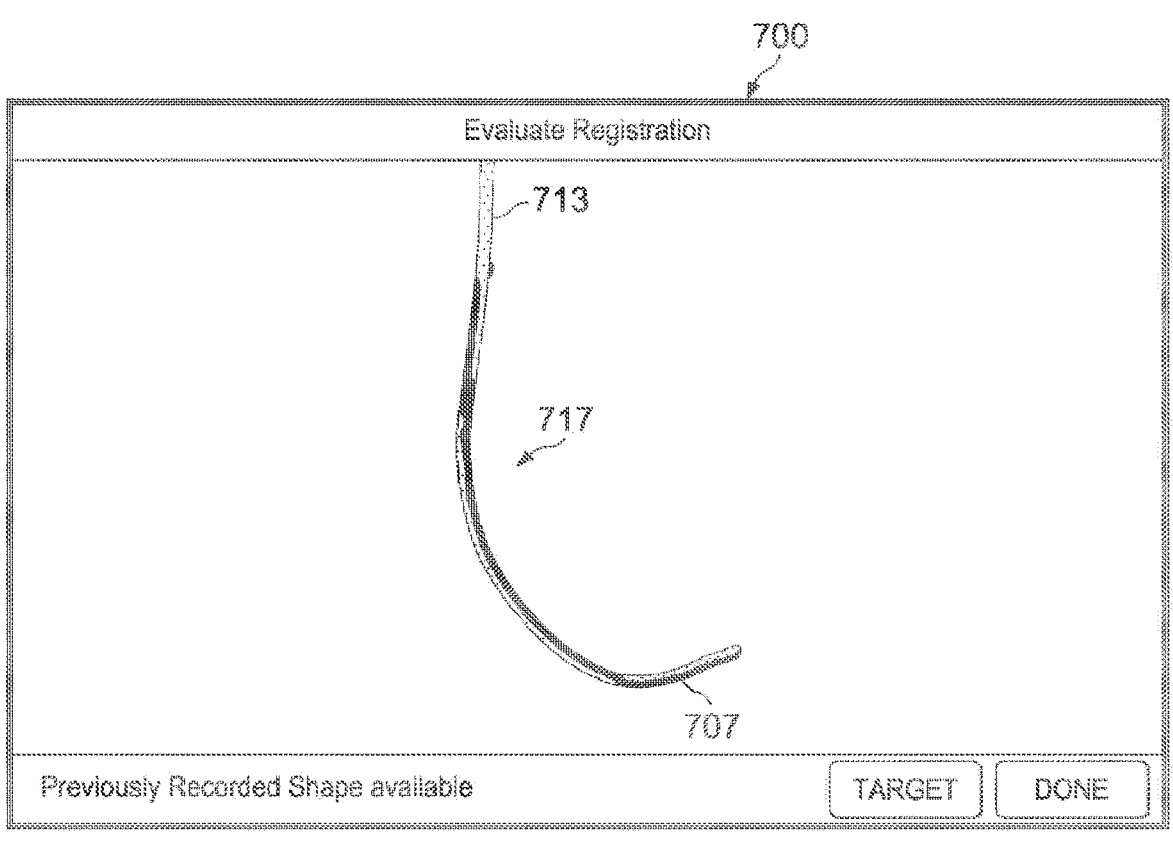
Figure 7G:
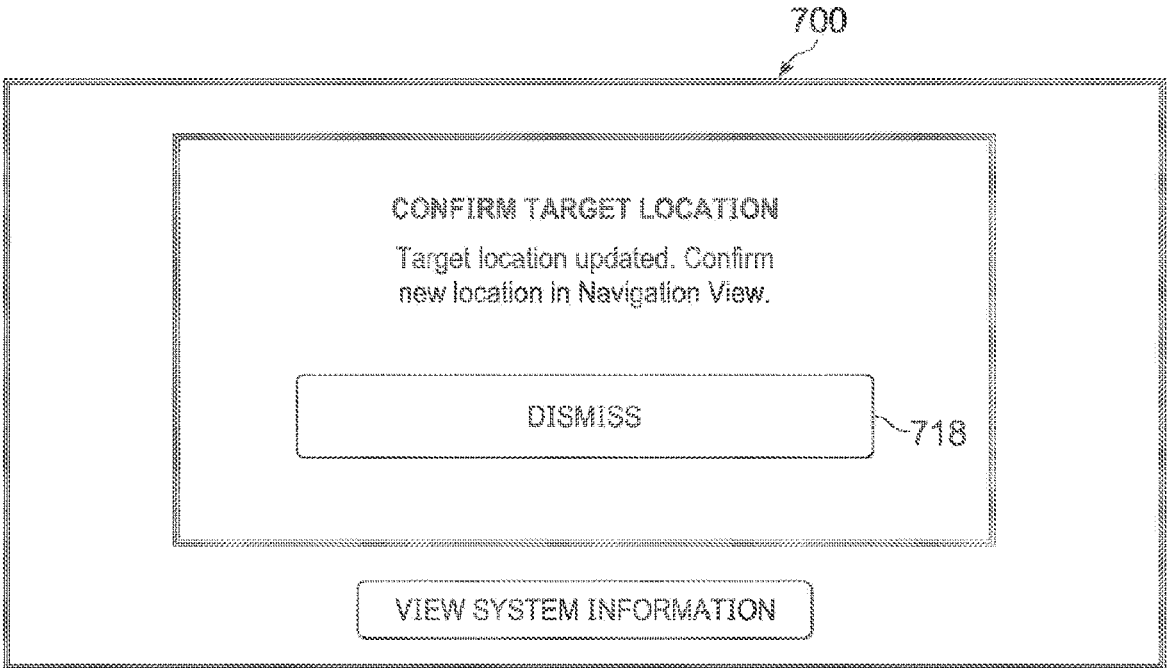

As discussed above in relation to process 224 of FIG. 2, the intra-operative image reference frame may be registered to the instrument reference frame. FIG. 7F illustrates a graphic 717 that may be displayed on the graphical user interface 700 to evaluate the result of such registration. As can be seen, the segmented shape of the instrument 707 is overlaid with the shape of the instrument 713 as generated by the instrument shape data from the shape sensor. If the registration is deemed successful, the location of the target from the intra-operative image data may be mapped to the instrument reference frame, as discussed above with reference to process 224, and the graphical user interface may be updated accordingly, including revising the location of the target and/or revising the location of one or more anatomical passages. Following the updates to the graphical user interface, the user may be asked to confirm the revised location of the target. FIG. 7G illustrates the graphical user interface 700 providing a confirmation election button 718. Furthermore, the control system may analyze the shape of the instrument 707 as compared to the shape of the instrument 713 and calculate a certainty or uncertainty metric associated with a confidence level of the accuracy of the registration. The closer the shape of the instrument 707 matches the shape of the instrument 713, the higher the confidence level may be. A revised location of the target 703 may be displayed with the certainty/uncertainty metric to provide a visual indication of the confidence level to the user.

Figure 8A:
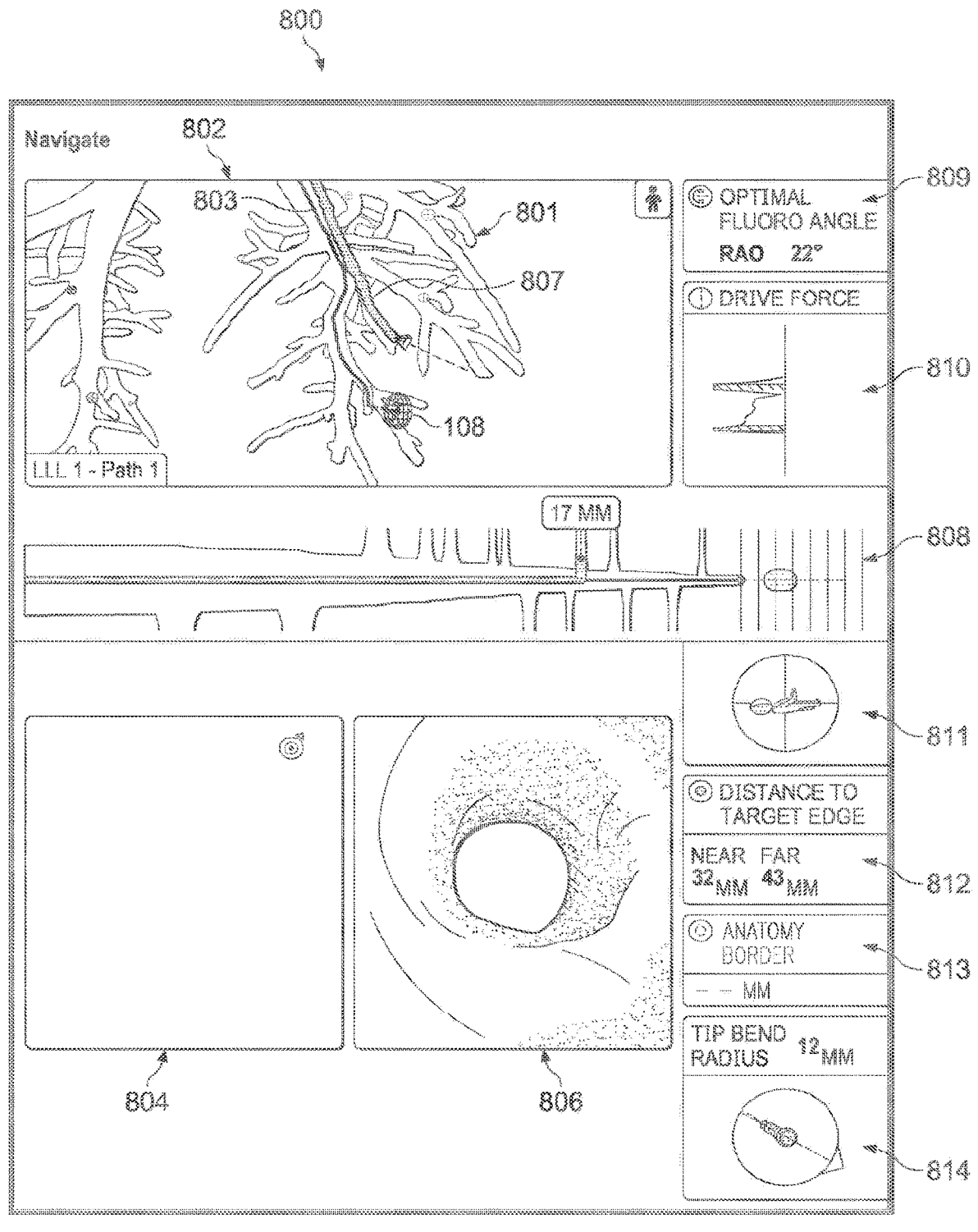
FIGS. 8A-8B illustrate information displayed on a graphical user interface during updating of a location of a target in a 3D model based upon intra-operative image data.
Figure 8B:
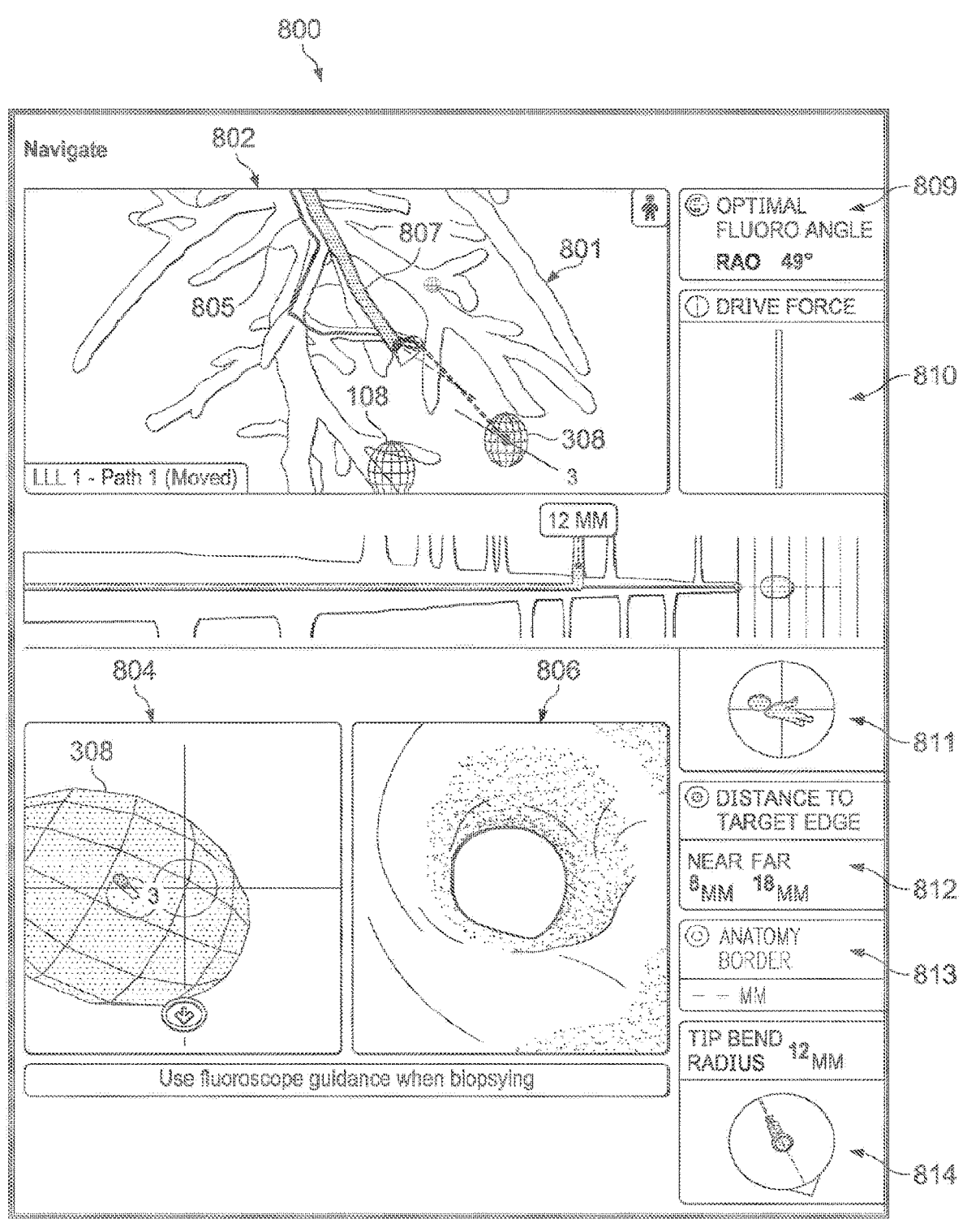

Illustrative graphics of a graphical user interface before and after the updating process 226 of FIG. 2 are shown in FIGS. 8A and 8B. As shown in FIG. 8A, a graphical user interface 800, which may be same as or similar to graphical user interface 700, includes a virtual navigation image 802 which displayed the 3D model 801 with the instrument 807 (which may be the same as instrument 707) and target 108 overlaid thereon. Additionally, a navigation path 803, as determined in process 208, may overlaid on the 3D model 801.

The graphical user interface 800 may also include a virtual camera view 804 and a physical camera view 806. The physical camera view 806 displays video from a camera disposed within the anatomy of the patient. For example, the instrument may comprise an endoscope and the physical camera view 806 may display a video feed from an endoscope camera. The virtual camera view 804 may display a computer-generated image of the target 108 from a perspective of the distal tip of the instrument 807. As can be seen in the virtual navigation image 802, the distal tip of the instrument 807 is not directed at the location of the target 108. Accordingly, there is no computer-generated image of the target 108 displayed in the virtual camera view 804.

Furthermore, the graphical user interface 800 may include a navigation overview 808 illustrating widths and branching relationships of various anatomical passages along the length of the navigation path 803, as well as the progress of the instrument 807 along the navigation path 803.

Various other graphics may also be provided by the graphical user interface 800. An optimal fluoroscopic angle graphic 809 may provide a user with a suggested positioning angle with respect to the patient to optimize imaging of the target (e.g., minimize obstructions). A drive force graphic 810 may provide a visualization of the forces applied (e.g., as measured at an actuator or as measured or estimated at the distal tip of the instrument) to navigate the instrument 807 to its current location. An orientation indicator 811 may provide a visual indication regarding the current orientation of the distal tip of the instrument 807 corresponding to the views provided by virtual camera view 804 and/or physical camera view 806. A target distance indicator 812 may convey a current distance between the distal tip of the instrument 807 and the target 108. In the illustrated embodiment, the distance indicator 812 provides a distance from the distal tip of the instrument 807 to the nearest point of the target 108 and a distance from the distal tip of the instrument 807 to the furthest point of the target 108. In some embodiments, a single distance may be provided such as a distance from the distal tip of the instrument 807 to a central point of the target or a specific point of interest within the target. An anatomy border distance indicator 813 may convey a current distance between the distal tip of the instrument 807 and the closest anatomy element, such as pleura, blood vessels, etc., in the direction of the tip of the instrument. A tip bend radius graphic 814 may provide an indication of a current bend radius of the distal tip of the instrument 807 which may be used during navigation to prevent over-bending of the instrument 807 which may cause damage to the instrument or patient tissue.

FIG. 8B illustrates the graphical user interface 800 after the location of the target is updated from target 108 to target 308. The revised location of the target 308 in the 3D model 801 may cause the control system to determine a revised navigation path 805 to the target 308. Furthermore, revisions to anatomical passages may result in determining that the instrument 807 is in a different anatomical passage than was assumed based upon the pre-operative image data. That is, initially, shape data from the shape sensor may be compared to shapes of anatomical passages in the pre-operative image data. It may be assumed that the instrument 807 is disposed within an anatomical passage having a shape most similar to the shape data. However, upon revising the shape of one or more anatomical passages based on the intra-operative image data, it may be determined that the shape data more closely matches a different anatomical passage. Accordingly, the graphical user interface may display a revised location of at least a portion (e.g., distal tip) of the instrument 807.

In some embodiments, an instrument such as instrument 807 may include a working channel through which a tool (e.g., biopsy needle) may be inserted. Segmentation of the instrument 807 may include segmentation of the tool as well.

In this regard, the tool may be separately identifiable from the instrument 807 in the graphical user interface. During instances in which the tool is extended or protruding from the instrument 807 during an intra-operative imaging procedure, a user may be able to visually confirm in the 3D model, via the graphical user interface, that the tool is positioned within the target 308 (e.g., tool-in-lesion biopsy confirmation). Alternatively, the control system may automatically analyze the segmented target 308 and segmented tool and provide a confirmation to the user that the tool is disposed within the target.

Additionally, a revised location of the target 308 may cause the target to fall within the field of view of the virtual camera in virtual camera view 804 as shown in FIG. 8B, as compared to FIG. 8A in which the target 108 is outside the field of view of the virtual camera.

Figure 9:
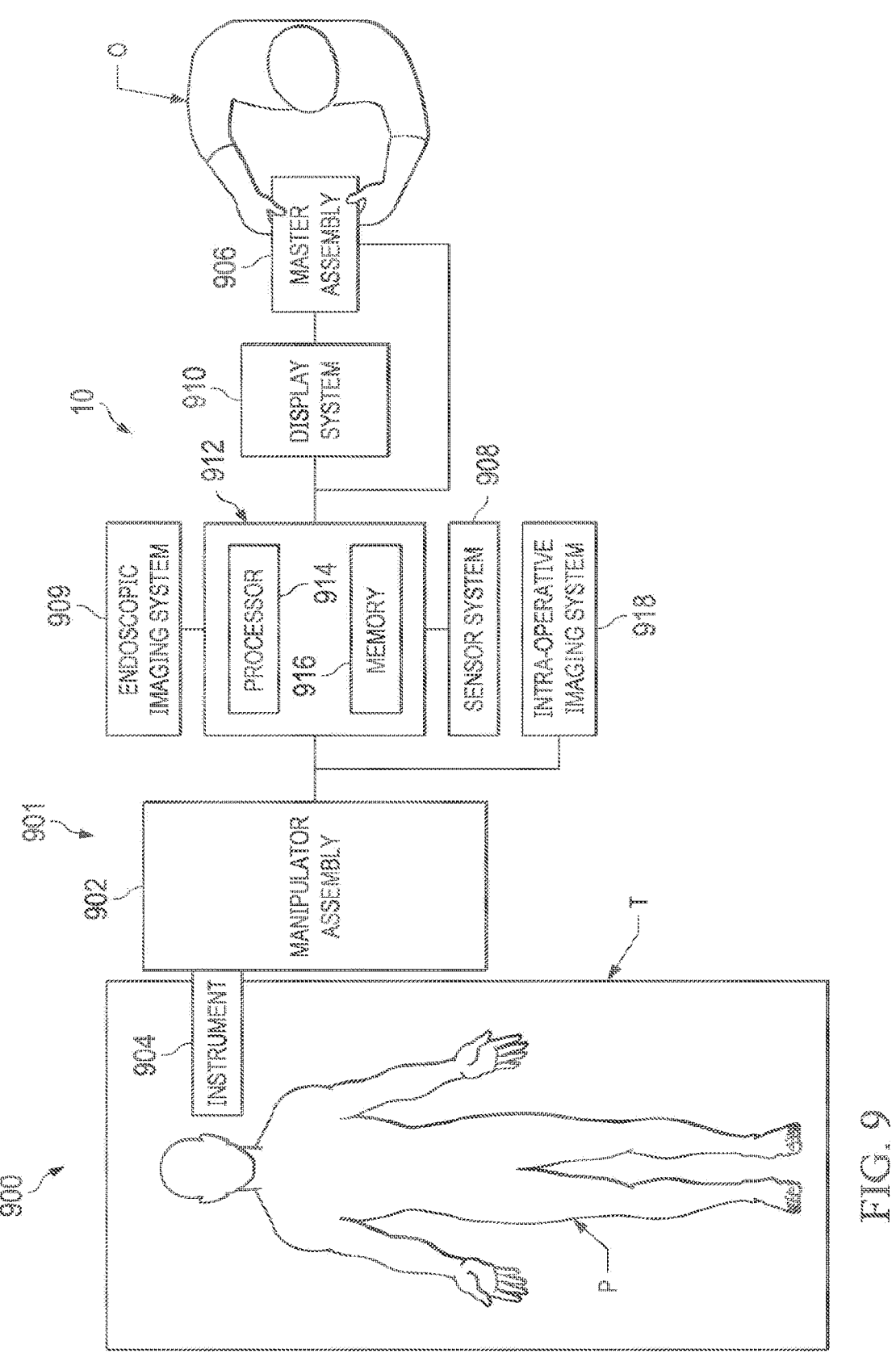
FIG. 9 illustrates a simplified diagram of a robotic or teleoperated medical system according to some embodiments.
Figure 10:
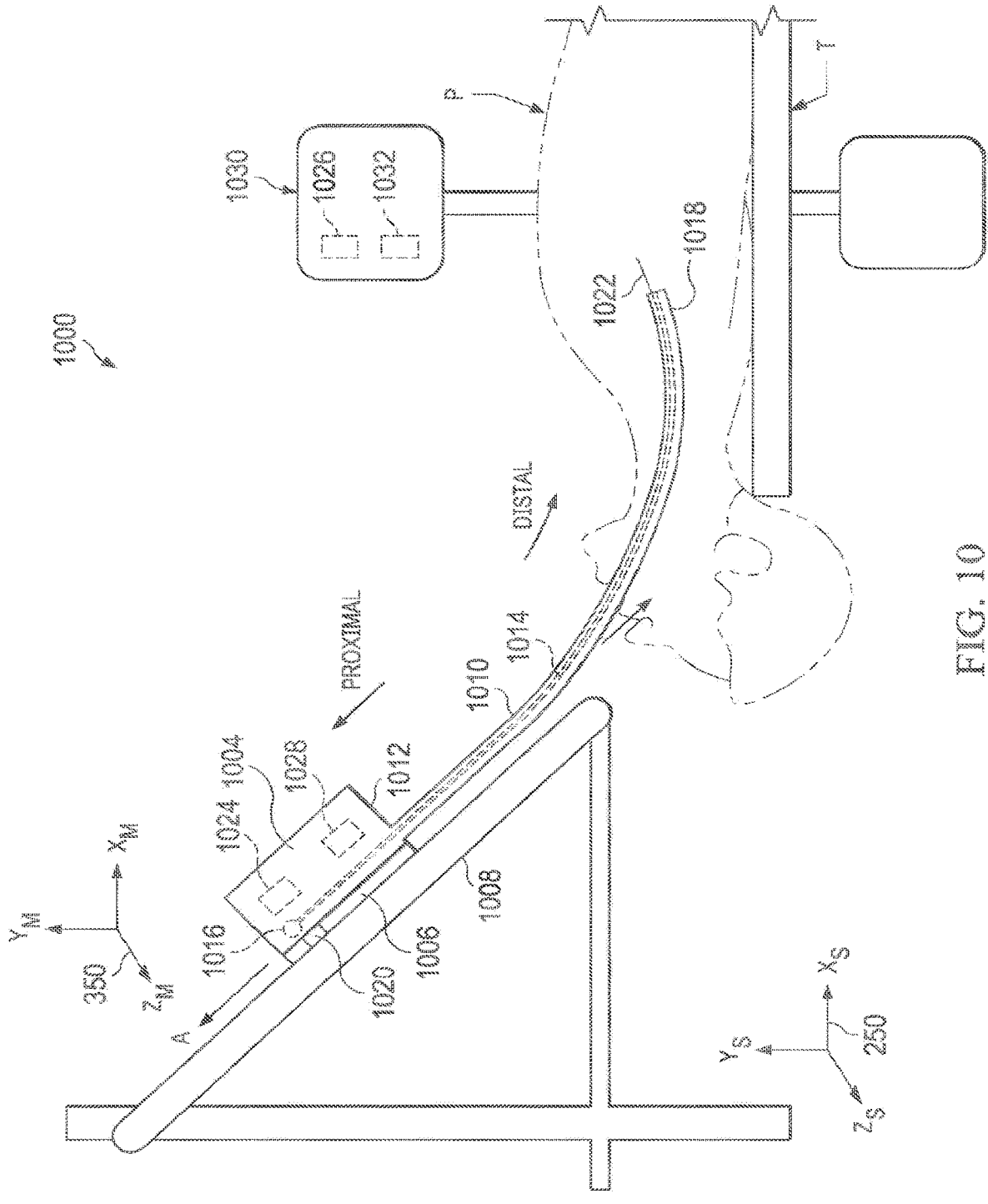
FIG. 10 illustrates a simplified diagram of a medical instrument system and an intraoperative imaging system according to some embodiments.

In some embodiments, the registration techniques of this disclosure, such as those discussed in relation to processes 210 and 222 of FIG. 2, may be used in an image-guided medical procedure performed with a robot-assisted medical system as shown in FIGS. 9 and 10. FIG. 9 illustrates a clinical system 10 includes a robot-assisted medical system 1200 and an intra-operative imaging system 918. The robot-assisted medical system 900 generally includes a manipulator assembly 902 for operating a medical instrument system 904 (including, for example, medical instrument 104) in performing various procedures on a patient P positioned on a table T in a surgical environment 901. The manipulator assembly 902 may be robot-assisted, non-assisted, or a hybrid robot-assisted and non-assisted assembly with select degrees of freedom of motion that may be motorized and/or robot-assisted and select degrees of freedom of motion that may be non-motorized and/or non-assisted. A master assembly 906, which may be inside or outside of the surgical environment 901, generally includes one or more control devices for controlling manipulator assembly 902. Manipulator assembly 902 supports medical instrument system 904 and may optionally include a plurality of actuators or motors that drive inputs on medical instrument system 904 in response to commands from a control system 912. The actuators may optionally include drive systems that when coupled to medical instrument system 904 may advance medical instrument system 904 into a naturally or surgically created anatomic orifice. Other drive systems may move the distal end of medical instrument system 904 in multiple degrees of freedom, which may include three degrees of linear motion (e.g., linear motion along the X, Y, Z Cartesian axes) and in three degrees of rotational motion (e.g., rotation about the X, Y, Z Cartesian axes). Additionally, the actuators can be used to actuate an articulable end effector of medical instrument system 904 for grasping tissue in the jaws of a biopsy device and/or the like.

Robot-assisted medical system 900 also includes a display system 910 (which may the same as display system 100) for displaying an image or representation of the surgical site and medical instrument system 904 generated by a sensor system 908 and/or an endoscopic imaging system 909. Display system 910 and master assembly 906 may be oriented so operator O can control medical instrument system 904 and master assembly 906 with the perception of telepresence.

In some embodiments, medical instrument system 904 may include components for use in surgery, biopsy, ablation, illumination, irrigation, or suction. Optionally medical instrument system 904, together with sensor system 908 may be used to gather (i.e., measure) a set of data points corresponding to locations within anatomical passages of a patient, such as patient P. In some embodiments, medical instrument system 904 may include components of the imaging system 909, which may include an imaging scope assembly or imaging instrument that records a concurrent or real-time image of a surgical site and provides the image to the operator or operator O through the display system 910. The concurrent image may be, for example, a two or three-dimensional image captured by an imaging instrument positioned within the surgical site. In some embodiments, the imaging system components that may be integrally or removably coupled to medical instrument system 904. However, in some embodiments, a separate endoscope, attached to a separate manipulator assembly may be used with medical instrument system 904 to image the surgical site. The imaging system 909 may be implemented as hardware, firmware, software or a combination thereof which interact with or are otherwise executed by one or more computer processors, which may include the processors of the control system 912.

The sensor system 908 may include a position/location sensor system (e.g., an electromagnetic (EM) sensor system) and/or a shape sensor system for determining the position, orientation, speed, velocity, pose, and/or shape of the medical instrument system 904.

Robot-assisted medical system 900 may also include control system 912. Control system 912 includes at least one memory 916 and at least one computer processor 914 for effecting control between medical instrument system 904, master assembly 906, sensor system 908, endoscopic imaging system 909, and display system 910. Control system 912 also includes programmed instructions (e.g., a non-transitory machine-readable medium storing the instructions) to implement some or all of the methods described in accordance with aspects disclosed herein, including instructions for providing information to display system 910.

Control system 912 may optionally further include a virtual visualization system to provide navigation assistance to operator O when controlling medical instrument system 904 during an image-guided surgical procedure. Virtual navigation using the virtual visualization system may be based upon reference to an acquired pre-operative or intra-operative dataset of anatomical passages. The virtual visualization system processes images of the surgical site imaged using imaging technology such as computerized tomography (CT), magnetic resonance imaging (MRI), fluoroscopy, thermography, ultrasound, optical coherence tomography (OCT), thermal imaging, impedance imaging, laser imaging, nanotube X-ray imaging, and/or the like.

An intra-operative imaging system 918 may be arranged in the surgical environment 901 near the patient P to obtain images of the patient P during a medical procedure. The intra-operative imaging system 918 may provide real-time or near real-time images of the patient P. In some embodiments, the intra-operative imaging system 918 may be a mobile C-arm cone-beam CT imaging system for generating three-dimensional images. For example, the intra-operative imaging system 918 may be a DynaCT imaging system from Siemens Corporation of Washington, D.C., or other suitable imaging system. In other embodiments, the imaging system may use other imaging technologies including CT, MRI, fluoroscopy, thermography, ultrasound, optical coherence tomography (OCT), thermal imaging, impedance imaging, laser imaging, nanotube X-ray imaging, and/or the like.

FIG. 10 illustrates a surgical environment 1000 with a surgical reference frame ($X_S$, $Y_S$, $Z_S$) 250 in which the patient P is positioned on the table T. Patient P may be stationary within the surgical environment in the sense that gross patient movement is limited by sedation, restraint, and/or other means. Cyclic anatomic motion including respiration and cardiac motion of patient P may continue unless the patient is asked to hold his or her breath to temporarily suspend respiratory motion. Within surgical environment 1000, a medical instrument 1004 (e.g., the medical instrument system 904), having a medical instrument reference frame ($X_M$, $Y_M$, $Z_M$) 350, is coupled to an instrument carriage 1006. In this embodiment, medical instrument 1004 includes an elongate device 1010, such as a flexible catheter, coupled to an instrument body 1012. Instrument carriage 1006 is mounted to an insertion stage 1008 fixed within surgical environment 1000. Alternatively, insertion stage 1008 may be movable but have a known location (e.g., via a tracking sensor or other tracking device) within surgical environment 1000. In these alternatives, the medical instrument reference frame is fixed or otherwise known relative to the surgical reference frame. Instrument carriage 1006 may be a component of a robot-assisted manipulator assembly (e.g., robot-assisted manipulator assembly 1002) that couples to medical instrument 1004 to control insertion motion (i.e., motion along an axis A) and, optionally, motion of a distal end 1018 of the elongate device 1010 in multiple directions including yaw, pitch, and roll. Instrument carriage 1006 or insertion stage 1008 may include actuators, such as servomotors, (not shown) that control motion of instrument carriage 1006 along insertion stage 1008.

In this embodiment, a sensor system (e.g., sensor system 908) includes a shape sensor 1014. Shape sensor 1014 may include an optical fiber extending within and aligned with elongate device 1010. In one embodiment, the optical fiber has a diameter of approximately 200 μm. In other embodiments, the dimensions may be larger or smaller. The optical fiber of shape sensor 1014 forms a fiber optic bend sensor for determining the shape of the elongate device 1010. In one alternative, optical fibers including Fiber Bragg Gratings (FBGs) are used to provide strain measurements in structures in one or more dimensions. Various systems and methods for monitoring the shape and relative position of an optical fiber in three dimensions are described in U.S. patent application Ser. No. 11/180,389 (filed Jul. 13, 2005) (disclosing "Fiber optic position and shape sensing device and method relating thereto"); U.S. patent application Ser. No. 12/047,056 (filed on Jul. 16, 2004) (disclosing "Fiber-optic shape and relative position sensing"); and U.S. Pat. No. 6,389,187 (filed on Jun. 17, 1998) (disclosing "Optical Fiber Bend Sensor"), which are all incorporated by reference herein in their entireties. Sensors in some embodiments may employ other suitable strain sensing techniques, such as Rayleigh scattering, Raman scattering, Brillouin scattering, and Fluorescence scattering. In some embodiments, the shape of the catheter may be determined using other techniques. For example, a history of the distal end pose of elongate device 1010 can be used to reconstruct the shape of elongate device 1010 over the interval of time.

As shown in FIG. 10, instrument body 1012 is coupled and fixed relative to instrument carriage 1006. In some embodiments, the optical fiber shape sensor 1014 is fixed at a proximal point 1016 on instrument body 1012. In some embodiments, proximal point 1016 of optical fiber shape sensor 1014 may be movable along with instrument body 1012 but the location of proximal point 1016 may be known (e.g., via a tracking sensor or other tracking device). Shape sensor 1014 measures a shape from proximal point 1016 to another point such as distal end 1018 of elongate device 1010 in the medical instrument reference frame ($X_M$, $Y_M$, $Z_M$).

Elongate device 1010 includes a channel (not shown) sized and shaped to receive a medical instrument 1022. In some embodiments, medical instrument 1022 may be used for procedures such as surgery, biopsy, ablation, illumination, irrigation, or suction. Medical instrument 1022 can be deployed through elongate device 1010 and used at a target location within the anatomy. Medical instrument 1022 may include, for example, image capture probes, biopsy instruments, laser ablation fibers, and/or other surgical, diagnostic, or therapeutic tools. Medical instrument 1022 may be advanced from the distal end 1018 of the elongate device 1010 to perform the procedure and then retracted back into the channel when the procedure is complete. Medical instrument 1022 may be removed from proximal end of elongate device 1010 or from another optional instrument port (not shown) along elongate device 1010.

Elongate device 1010 may also house cables, linkages, or other steering controls (not shown) to controllably bend distal end 1018. In some examples, at least four cables are used to provide independent "up-down" steering to control a pitch of distal end 1018 and "left-right" steering to control a yaw of distal end 1018.

A position measuring device 1020 provides information about the position of instrument body 1012 as it moves on insertion stage 1008 along an insertion axis A. Position measuring device 1020 may include resolvers, encoders, potentiometers, and/or other sensors that determine the rotation and/or orientation of the actuators controlling the motion of instrument carriage 1006 and consequently the motion of instrument body 1012. In some embodiments, insertion stage 1008 is linear, while in other embodiments, the insertion stage 1008 may be curved or have a combination of curved and linear sections.

An intra-operative imaging system 1030 (e.g., imaging system 918) is arranged near the patient P to obtain three-dimensional images of the patient while the elongate device 1010 is extended within the patient. The intra-operative imaging system 1030 may provide real-time or near real-time images of the patient P. One or more fiducial markers (not shown) may be positioned on the patient P during pre-operative imaging and intra-operative imaging to improve registration.

In some embodiments, the medical instrument 1004 or another component of a robot-assisted medical system registered to the medical instrument 1004 may include an instrument clock 1024. The imaging system 1030 may include an imaging clock 1026. The clocks 1024, 1026 may be time synchronized on a predetermined schedule or in response to a synchronization initiation event generated by a user, a control system, or a synchronization system. In some embodiments, the clocks 1024, 1026 may be components of a synchronization system that may be a centralized or distributed system further comprising servers, wired or wireless communication networks, communication devices, or other components for executing synchronization algorithms and protocols. In some embodiments, the medical instrument 1004 or another component of a robot-assisted medical system registered to the medical instrument 1004 may include a communication device 1028. The imaging system 1030 may include a communication device 1032.

In the description, specific details have been set forth describing some embodiments. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

Elements described in detail with reference to one embodiment, implementation, or application optionally may be included, whenever practical, in other embodiments, implementations, or applications in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, implementation, or application may be incorporated into other embodiments, implementations, or aspects unless specifically described otherwise, unless the one or more elements would make an embodiment or implementation non-functional, or unless two or more of the elements provide conflicting functions.

Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately. For simplicity, in some instances the same reference numbers are used throughout the drawings to refer to the same or like parts.

While some embodiments are provided herein with respect to medical procedures, any reference to medical or surgical instruments and medical or surgical methods is non-limiting. For example, the instruments, systems, and methods described herein may be used for non-medical purposes including industrial uses, general robotic uses, and sensing or manipulating non-tissue work pieces. Other example applications involve cosmetic improvements, imaging of human or animal anatomy, gathering data from human or animal anatomy, and training medical or non-medical personnel. Additional example applications include use for procedures on tissue removed from human or animal anatomies (without return to a human or animal anatomy) and performing procedures on human or animal cadavers. Further, these techniques can also be used for surgical and nonsurgical medical treatment or diagnosis procedures.

The methods described herein are illustrated as a set of operations or processes. Not all the illustrated processes may be performed in all embodiments of the methods. Additionally, one or more processes that are not expressly illustrated or described may be included before, after, in between, or as part of the example processes. In some embodiments, one or more of the processes may be performed by the control system (e.g., control system 112) or may be implemented, at least in part, in the form of executable code stored on non-transitory, tangible, machine-readable media that when run by one or more processors (e.g., the processors 114 of control system 112) may cause the one or more processors to perform one or more of the processes.

One or more elements in embodiments of this disclosure may be implemented in software to execute on a processor of a computer system such as control processing system. When implemented in software, the elements of the embodiments are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one embodiment, the control system supports wireless communication protocols such as Bluetooth, IrDA, HomeRF, IEEE 802.11, DECT, and Wireless Telemetry.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the embodiments are not described with reference to any particular programming language. It will be appreciated that a variety of programming languages may be used to implement the teachings as described herein.

In some instances well known methods, procedures, components, and circuits have not been described in detail so as not to unnecessarily obscure aspects of the embodiments. This disclosure describes various instruments, portions of instruments, and anatomic structures in terms of their state in three-dimensional space. As used herein, the term "position" refers to the location of an object or a portion of an object in a three-dimensional space (e.g., three degrees of translational freedom along Cartesian x-, y-, and z-coordinates). As used herein, the term "orientation" refers to the rotational placement of an object or a portion of an object (three degrees of rotational freedom—e.g., roll, pitch, and yaw). As used herein, the term "pose" refers to the position of an object or a portion of an object in at least one degree of translational freedom and to the orientation of that object or portion of the object in at least one degree of rotational freedom (up to six total degrees of freedom). As used herein, the term "shape" refers to a set of poses, positions, or orientations measured along an object.

While certain illustrative embodiments have been described and shown in the accompanying drawings, it is to be understood that such embodiments are merely illustrative of and not restrictive on the broad invention, and that the embodiments not be limited to the specific constructions and arrangements shown and described, since various other modifications may occur to those ordinarily skilled in the art.

What is claimed is:

1. A system comprising:
one or more processors;
a user display; and
memory having computer readable instructions stored thereon, wherein the computer readable instructions, when executed by the one or more processors, cause the system to:
obtain pre-operative image data of anatomical passages of a patient, wherein the pre-operative image data includes a target lesion;
display, in a graphical user interface on the user display, a model of the anatomical passages of the patient and the target lesion, wherein the model is generated from the pre-operative image data;
receive intra-operative image data from an imaging system;
instruct a user to identify the target lesion in the intra-operative image data;
receive a user selection of a portion of the intra-operative image data corresponding to the target lesion;
based on the user selection, determine a location of the target lesion from the intra-operative image data;
instruct a user to identify a portion of the intra-operative image data corresponding to an instrument disposed in the anatomical passages of the patient;
receive a user selection of the portion of the intra-operative image data corresponding to the instrument;
display, on the user display, a boundary overlaid on the intra-operative image data, the boundary corresponding to a portion of the instrument visible in the intra-operative image data;
register an intra-operative image reference frame of the intra-operative image data to an instrument reference frame of the instrument;
map the location of the target lesion from the intra-operative image data to the instrument reference frame;
update a location of the target lesion in the model to the location of the target lesion from the intra-operative image data; and
display, in the graphical user interface on the user display, the model with the updated location of the target lesion.

2. The system of claim 1, wherein updating the location of the target lesion in the model is based on a location of the instrument determined based on the user selection of the portion of the intra-operative image data corresponding to the instrument.

3. The system of claim 1, wherein receiving the user selection of the portion of the instrument in the intra-operative image data comprises receiving a user selection of a distal tip of the instrument.

4. The system of claim 1, wherein the registering the intra-operative image reference frame to the instrument reference frame comprises registration based on translation only, wherein the translation is based on a position of the portion of the intra-operative image data corresponding to the instrument.

5. The system of claim 1, wherein the registering the intra-operative image reference frame to the instrument reference frame comprises registration based on translation and rotation, wherein the rotation is based on an orientation of the portion of the intra-operative image data corresponding to the instrument.

6. The system of claim 1, wherein updating the location of the target lesion comprises updating the location of the target lesion in a virtual camera view of the model, wherein the virtual camera view is from a perspective of a distal tip of the instrument.

7. The system of claim 1, wherein updating the location of the target lesion comprises updating the location of the target lesion in a virtual navigation image generated at least in part from the model.

8. The system of claim 1, wherein the computer readable instructions, when executed by the one or more processors, further cause the system to:
display, on the user display, the intra-operative image data in an anatomical plane.

9. The system of claim 8, wherein the anatomical plane comprises a coronal plane, a transverse plane, or a sagittal plane.

10. The system of claim 8, wherein displaying the intra-operative image data in the anatomical plane comprises displaying the intra-operative image data in a plurality of anatomical planes.

11. The system of claim 8, wherein the computer readable instructions, when executed by the one or more processors, further cause the system to:
receive a user input to scroll through a plurality of intra-operative images in the anatomical plane, wherein receiving the user selection of the portion of the intra-operative image data corresponding to the target lesion comprises receiving the user selection in at least one of the plurality of intra-operative images in the anatomical plane.

12. The system of claim 1, wherein the computer readable instructions, when executed by the one or more processors, further cause the system to:
display, on the user display, a target icon on the portion of the intra-operative image data corresponding to the target lesion.

13. The system of claim 1, wherein the computer readable instructions, when executed by the one or more processors, further cause the system to:
display, on the user display, the intra-operative image data in a plurality of view windows, wherein a first view window of the plurality of view windows displays the intra-operative image data in one or more of a coronal, transverse, or sagittal plane, and wherein the first view window is larger than a second view window of the plurality of view windows.

14. The system of claim 1, wherein the imaging system comprises a fluoroscopy imaging system or a cone-beam computed tomography imaging system.

15. The system of claim 1, wherein the computer readable instructions, when executed by the one or more processors, further cause the system to:
segment, from the intra-operative image data, the portion of the intra-operative image data corresponding to the target lesion.

16. The system of claim 1, wherein the computer readable instructions, when executed by the one or more processors, further cause the system to:
segment, from the intra-operative image data, the portion of the intra-operative image data corresponding to the instrument.

17. The system of claim 16, wherein the computer readable instructions, when executed by the one or more processors, further cause the system to:

analyze a result of segmentation of the instrument from the intra-operative image data and determine the result is unsatisfactory.

18. The system of claim 1, wherein the computer readable instructions, when executed by the one or more processors, further cause the system to:

compare a first shape of the instrument based on shape sensor data and a second shape of the instrument based on segmentation of the intra-operative image data; and based on the comparison, calculate a certainty/uncertainty metric associated with the registration of the intra-operative image reference frame to the instrument reference frame.

19. The system of claim 3, wherein the computer readable instructions, when executed by the one or more processors, further cause the system to:

display, on the user display, the distal tip of the instrument overlaid on the intra-operative image data.

\* \* \* \* \*